United States Patent [19]

Nakamura

[11] Patent Number: 5,438,589
[45] Date of Patent: Aug. 1, 1995

[54] SPREAD SPECTRUM COMMUNICATION SYSTEM

[75] Inventor: Masaru Nakamura, Yokohama, Japan

[73] Assignee: Ricoh Company, Ltd., Tokyo, Japan

[21] Appl. No.: 177,606

[22] Filed: Jan. 4, 1994

[30] Foreign Application Priority Data

| | | |
|---|---|---|
| Jan. 6, 1993 [JP] | Japan | 5-016732 |
| Mar. 3, 1993 [JP] | Japan | 5-067543 |
| Sep. 14, 1993 [JP] | Japan | 5-228377 |

[51] Int. Cl.$^6$ .............................................. H04K 1/00
[52] U.S. Cl. .................................... 375/200; 380/34
[58] Field of Search .............................. 375/1; 380/34

[56] References Cited

U.S. PATENT DOCUMENTS

| | | | |
|---|---|---|---|
| 4,862,478 | 8/1989 | McIntosh | 375/1 |
| 5,081,644 | 1/1992 | Uchida et al. | 375/1 |
| 5,253,268 | 10/1993 | Omura et al. | 375/1 |
| 5,303,258 | 4/1994 | Nakamura | 375/1 |

OTHER PUBLICATIONS

"Spread Spectrum Communication System in ETS-VI Inter-Satellite Communication Experiments," H. Kikuchi, et al., IEICE of Japan, SSTA90-45, Oct. 25 and 26, 1990.

"Spread Spectrum Communication System," p. 280, M. Yokoyama, May 20, 1988.

"Coherent Spread Spectrum Systems," p. 347, J. K. Holmes, 1990.

*Primary Examiner*—Tod R. Swann
*Attorney, Agent, or Firm*—Oblon, Spivak, McClelland, Maier & Neustadt

[57] ABSTRACT

A spread spectrum communication system includes a transmitter and a receiver responsive to a signal transmitted by the transmitter, the transmitter including: a pseudonoise signal generator for generating a pseudonoise signal in accordance with a clock signal; a pseudonoise signal part for generating a Manchester coded pseudonoise signal by multiplying the pseudonoise signal output from the pseudonoise signal generator by the clock signal; a first modulation part for generating a first spread spectrum signal by multiplying the pseudonoise signal output from the pseudonoise signal generator by a first data signal indicating first information; a second modulation part for generating a second spread spectrum signal by multiplying the Manchester coded pseudonoise signal output from the pseudonoise signal part by a second data signal indicating second information; and a synthesizing part for generating a signal to be transmitted, by adding the first spread spectrum signal output from the first modulation part to the second spread spectrum signal output from the second modulation part.

22 Claims, 29 Drawing Sheets

(MODULATOR)

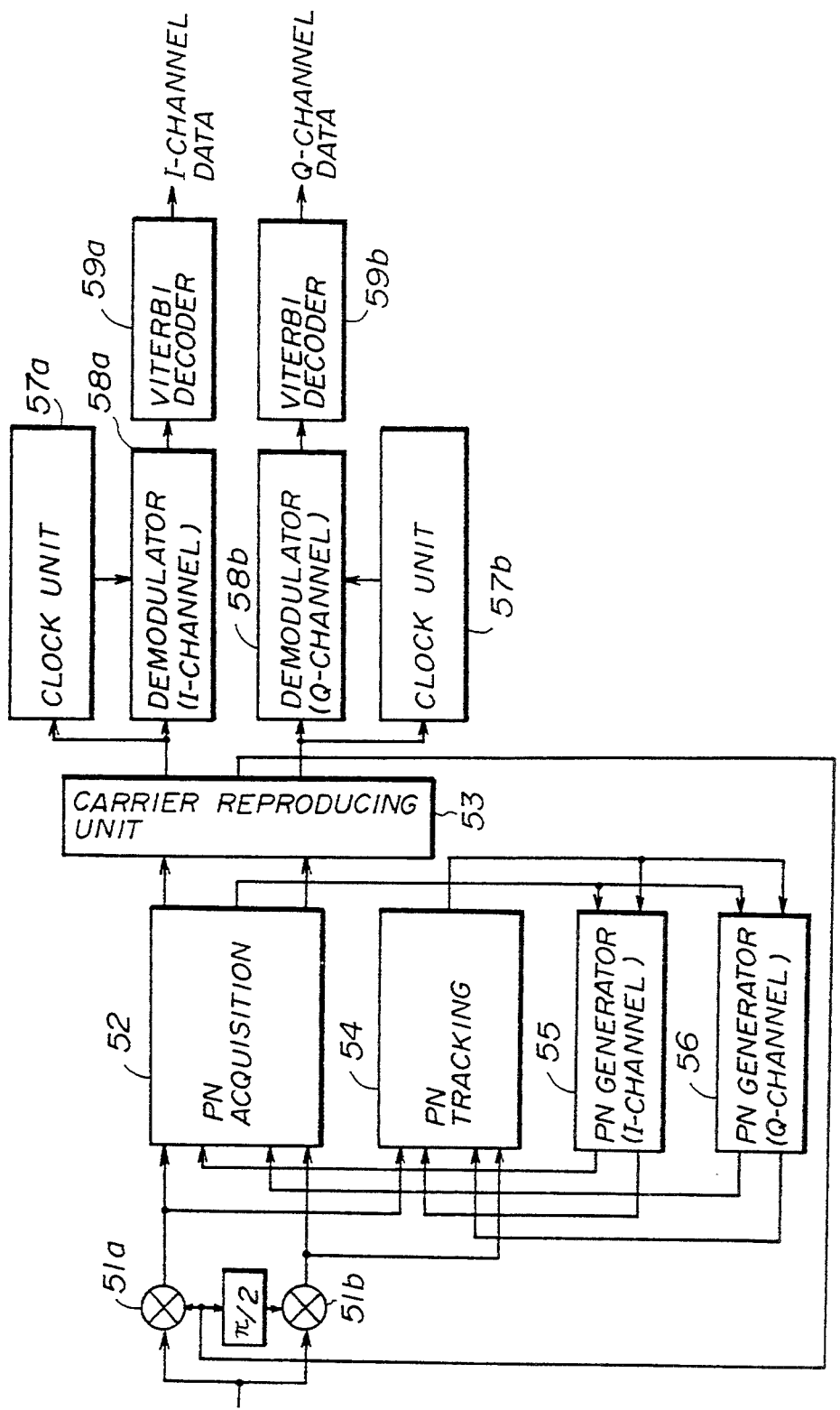

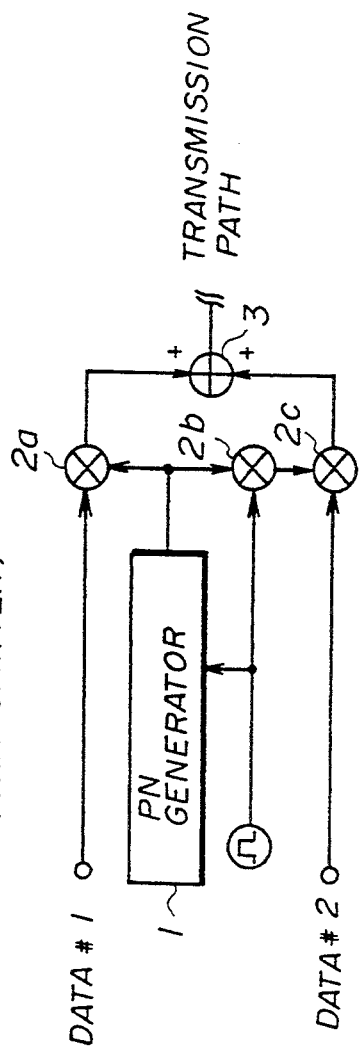
FIG. 3A (TRANSMITTER)
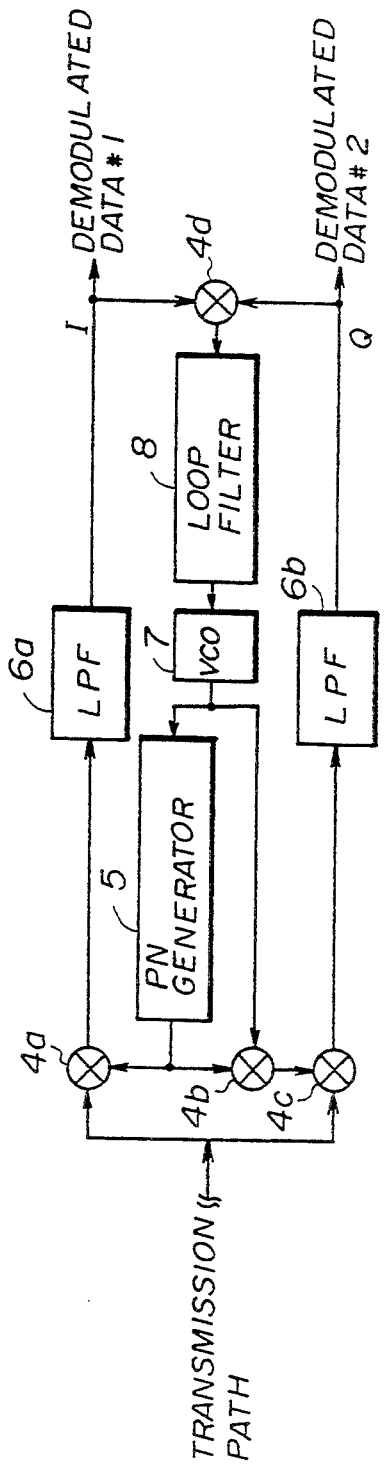
FIG. 3B (RECEIVER)

(TRANSMITTER)

(RECEIVER)

(TRANSMITTER)

(RECEIVER)

(TRANSMITTER)

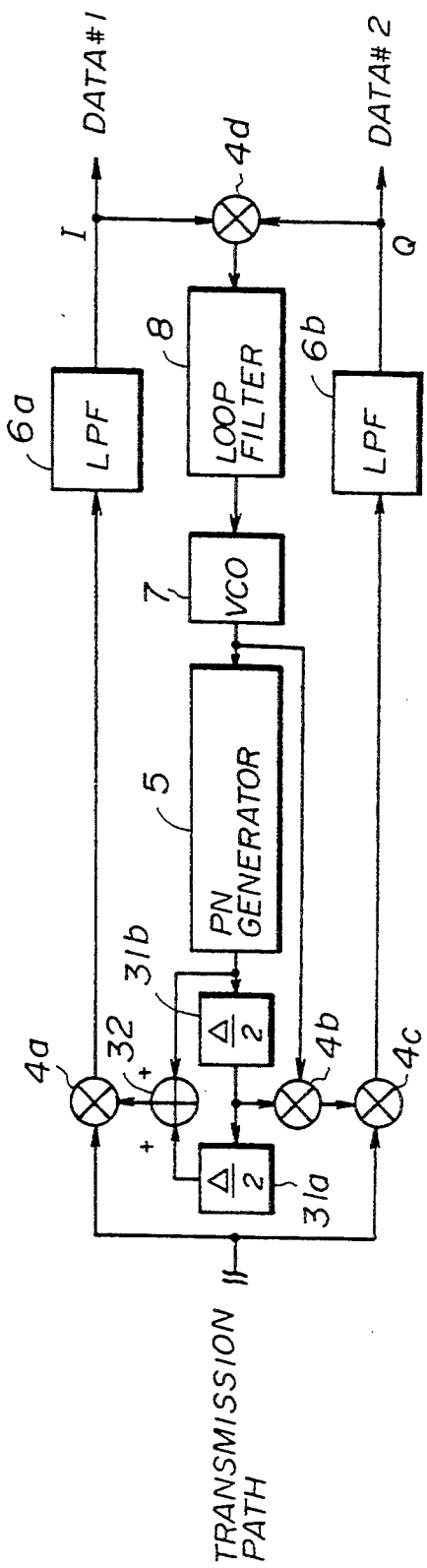
FIG.12 (RECEIVER)

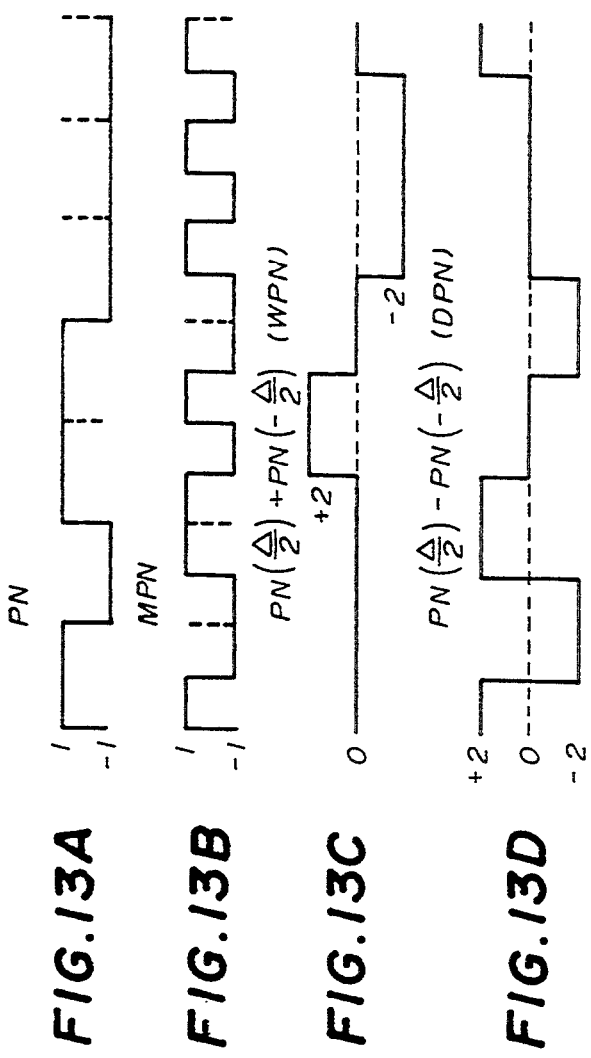

CROSSCORRELATION
OF PN AND WPN

CROSSCORRELATION
OF PN AND MPN

CROSSCORRELATION
OF MPN AND WPN

AUTOCORRELATION
OF MPN (RECEIVER)

CROSSCORRELATION OF PN AND WPN

CROSSCORRELATION OF PN AND DPN

CROSSCORRELATION OF MPN AND WPN

CROSSCORRELATION OF MPN AND DPN

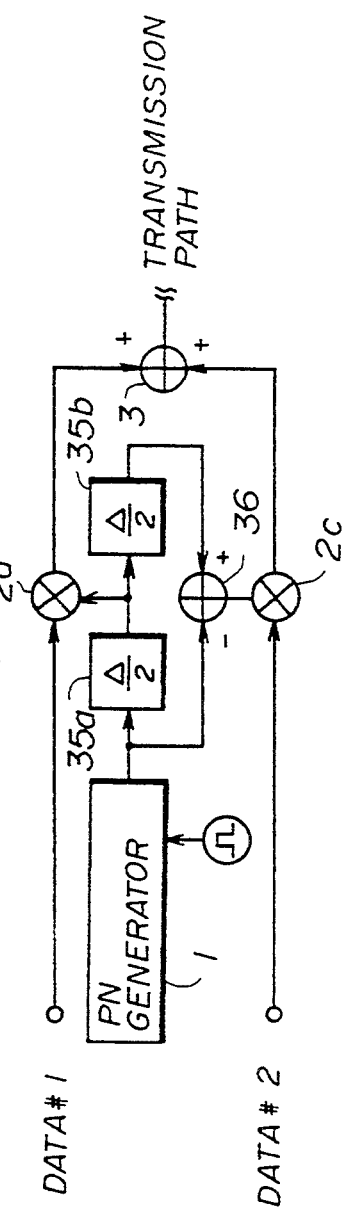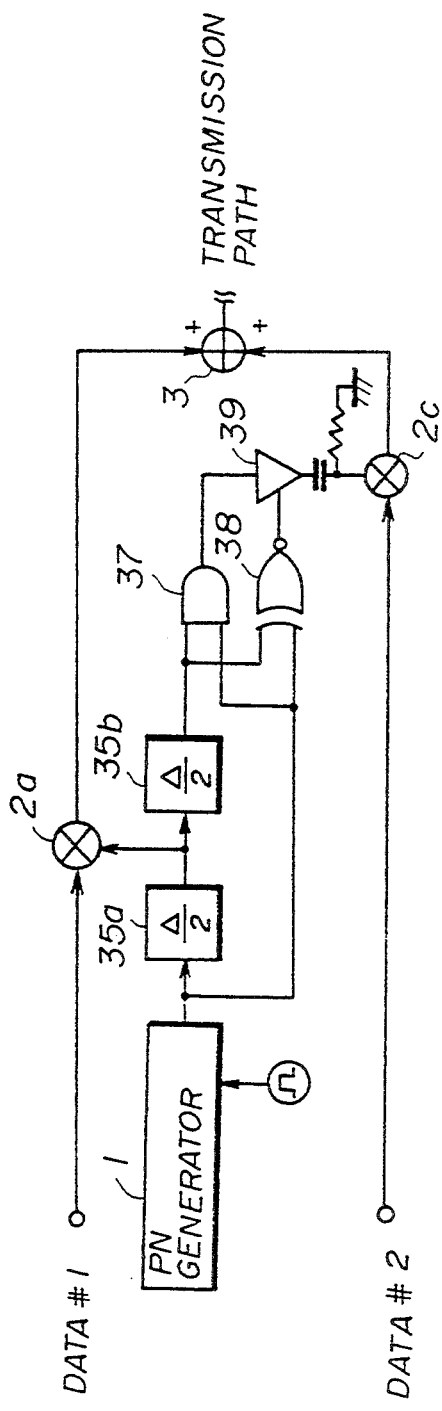

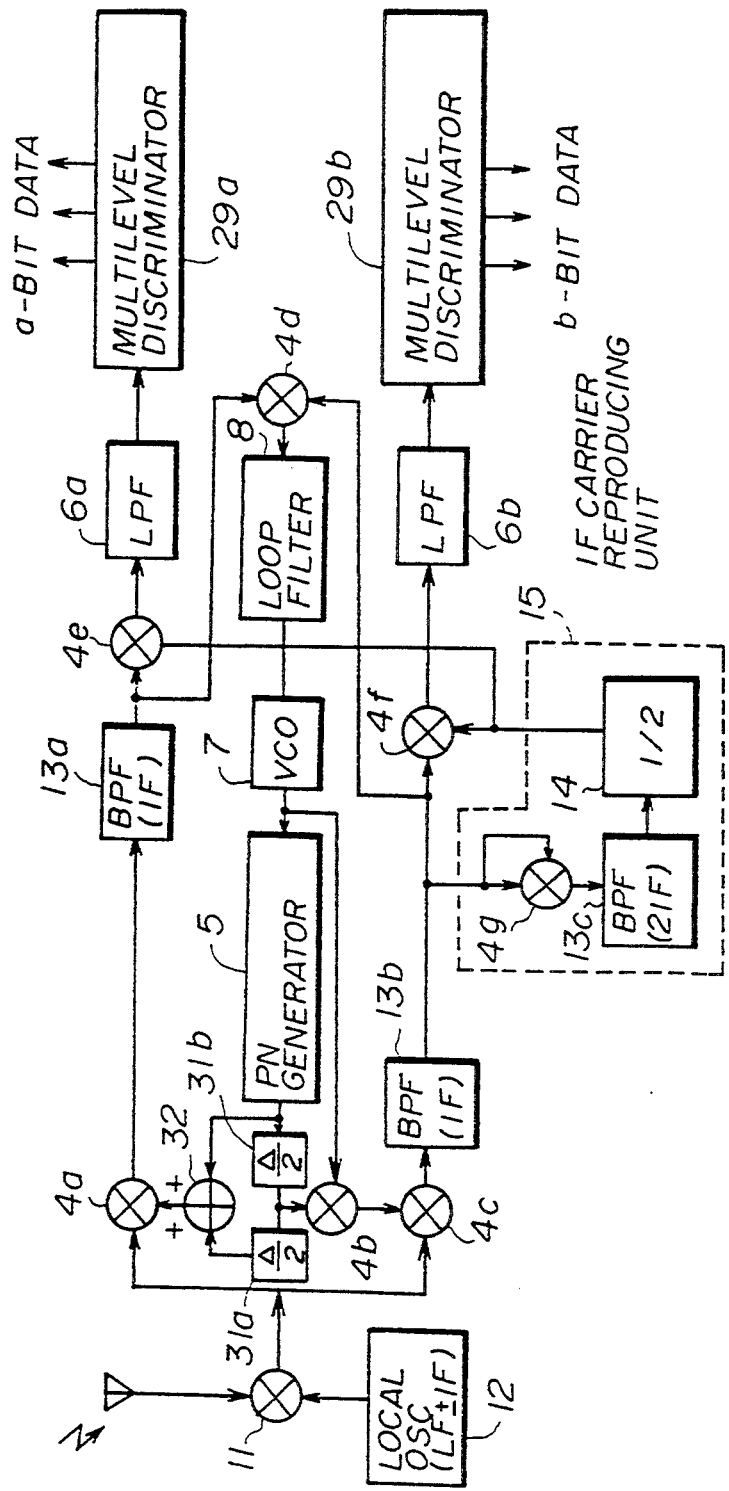
FIG. 21 (RECEIVER)

(TRANSMITTER)

(RECEIVER)

(TRANSMITTER)

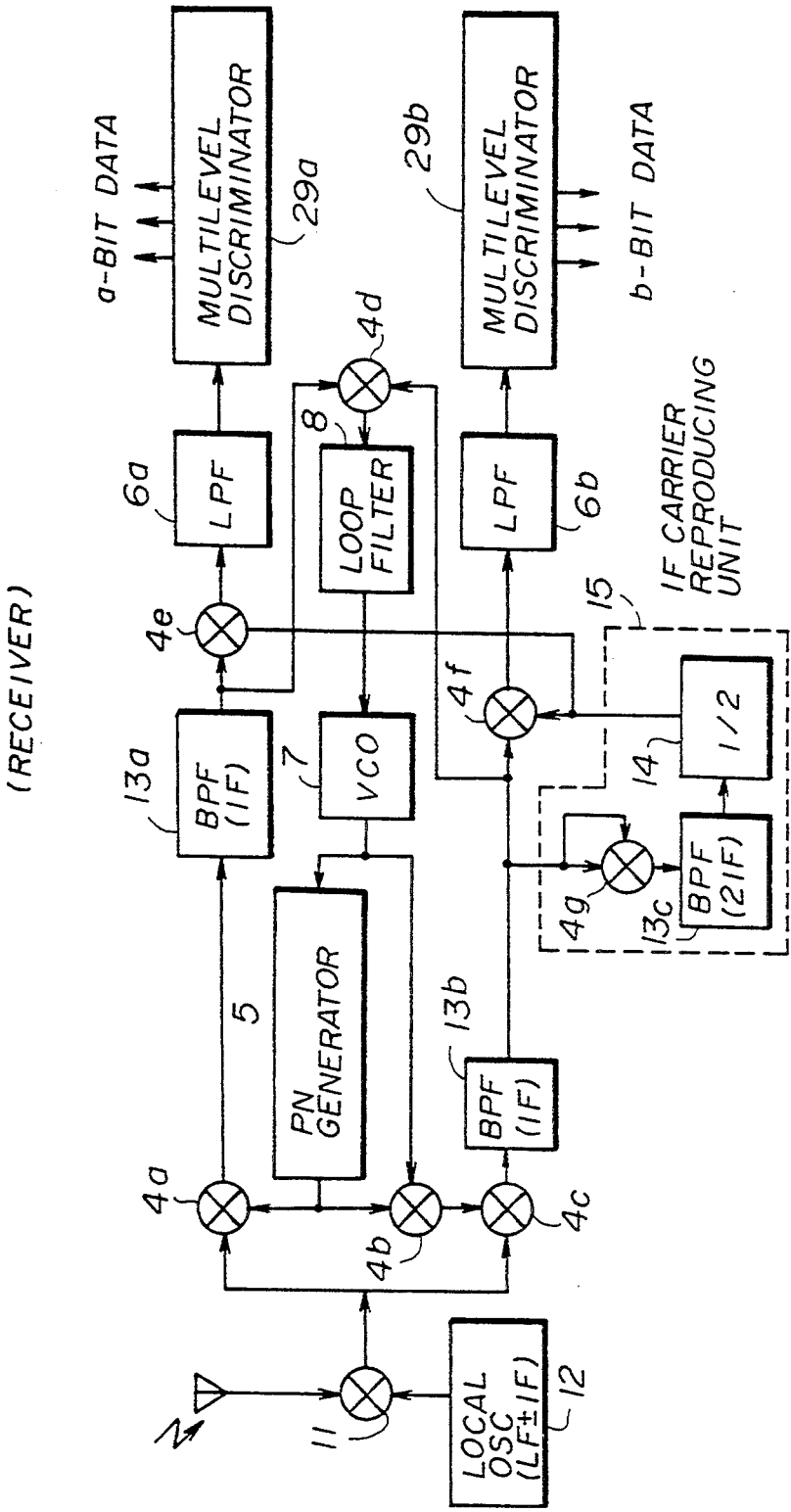
FIG. 23B (RECEIVER)

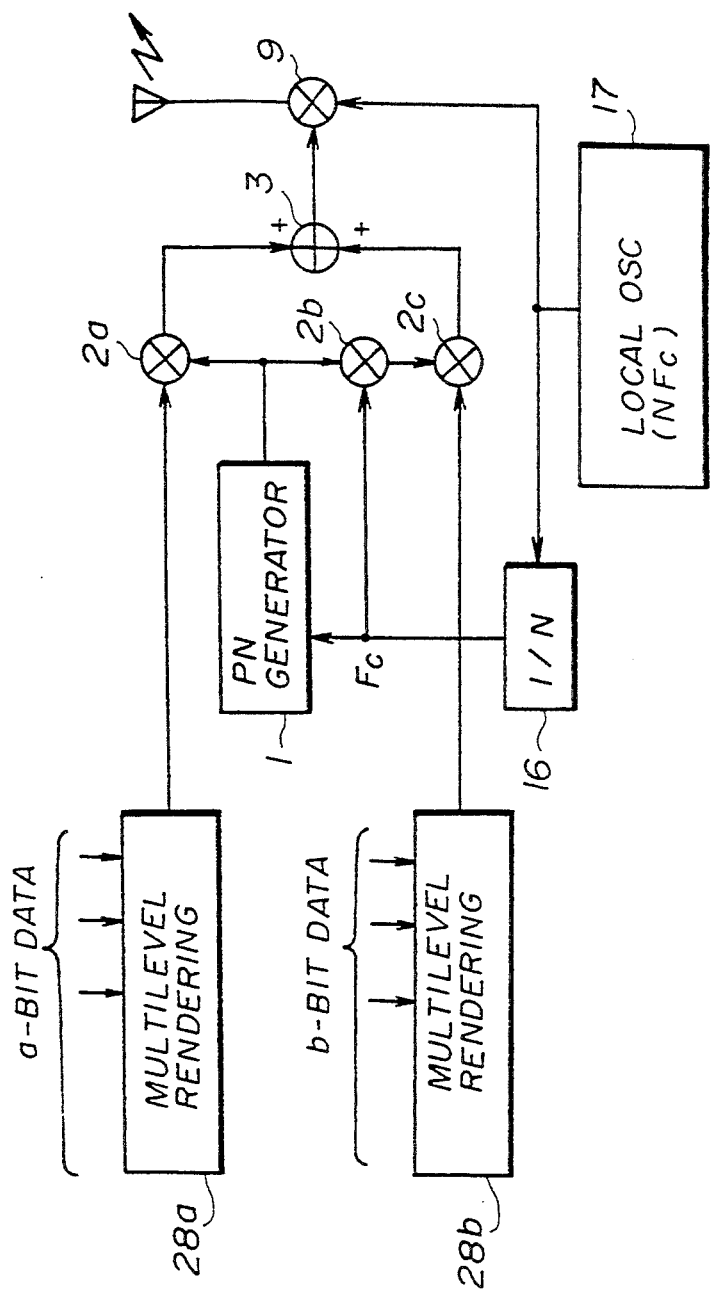
FIG. 24A (TRANSMITTER)

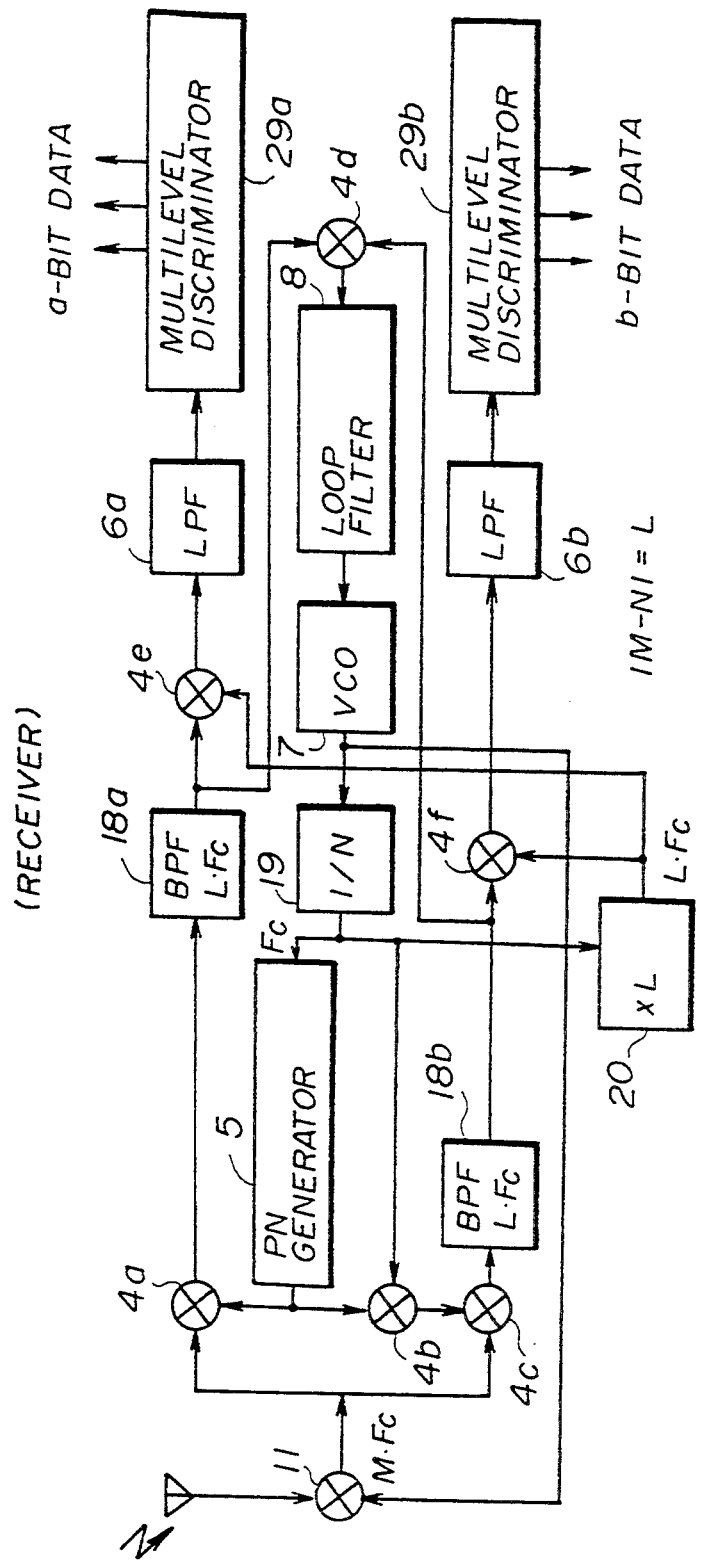
FIG. 24B (RECEIVER)

SPREAD SPECTRUM COMMUNICATION SYSTEM

BACKGROUND OF THE INVENTION

The present invention generally relates to a spread spectrum communication system, and more particularly to a spread spectrum communication system having a transmitter for transmitting a spread spectrum signal modulated by two data signals and having a receiver for receiving the spread spectrum signal to reproduce the data signals by a synchronization loop.

Recently, several types of spread spectrum communication systems have been proposed for radio communication, digital data communication, local area network communication and cordless telephone systems.

"Coherent Spread Spectrum Systems" page 347 by J. K. Holmes, published by R. E. Krieger Publishing Company of Florida in U.S.A. (reprint edition 1990), discloses a quadriphase direct sequence transmitter for spread spectrum communication in which a quadriphase pseudonoise (PN) signal to be transmitted is generated by modulating two distinct codes (having a small crosscorrelation) in accordance with two data signals.

"Spread Spectrum Communication System In ETS-VI Inter-Satellite Communication Experiments" by H. Kikuchi et al., a transaction of the Institute of Electronics, Information and Communication Engineers (IEICE) of Japan, SSTA90-45, Oct. 25 and 26, 1990, discloses an experimental spread spectrum communication system to which the above described Holmes method is used.

FIG. 1A shows a modulator of the experimental spread spectrum communication system disclosed in the above mentioned publication. This spread spectrum modulator carries out the pseudonoise signal modulation of the S-band Inter-satellite Communication (SIC) return link. FIG. 1B shows a demodulator of another experimental spread spectrum communication system disclosed in the above mentioned publication. This spread spectrum demodulator carries out the pseudonoise signal demodulation of the SIC return link.

The spread spectrum modulator in FIG. 1A includes an oscillator (OSC) 41 for generating a clock signal, a synthesizer 42, an I-channel pseudonoise (PN) generator 43, a Q-channel pseudonoise (PN) generator 44, a first convolutional coder 45 for encoding I-channel data to produce a first code sequence, a second convolutional coder 46 for encoding Q-channel data into a second code sequence, four multipliers 47a through 47d with two $\pi/2$ phase shifters, and an adder 48.

In FIG. 1A, a clock signal from the OSC 41 is supplied to the synthesizer 42, and the synthesizer 42 generates a carrier signal and a drive clock signal, in accordance with the clock signal from the OSC 41. The drive clock signal from the synthesizer 42 is supplied to each of the PN generators 43 and 44, so that the PN generators 43 and 44 respectively generate a first PN signal and a second PN signal in accordance with the drive clock signal from the synthesizer 42. The coder 45 produces the first data signal (code sequence) in accordance with the I-channel data, and the coder 46 produces the second data signal (code sequence) in accordance with the Q-channel data.

The first data signal from the coder 45 is multiplied at the multiplier 47a by the first PN signal from the generator 43 to produce a first spread spectrum signal, and the second data signal from the coder 46 is multiplied at the multiplier 47b by the second PN signal from the generator 44 to produce a second spread spectrum signal. The carrier signal and a $\pi/2$ phase-shifted carrier signal are multiplied at the multipliers 47c and 47d by the first and second spread spectrum signals from the multipliers 47a and 47b, respectively. The two resulting signals from the multipliers 47c and 47d are added to each other at the adder 48 to produce a SIC return link signal.

The spread spectrum demodulator in FIG. 1B includes two multipliers 51a and 51b with a $\pi/2$ phase shifter, a PN acquisition unit 52, a carrier reproducing unit 53, a PN tracking unit 54, an I-channel PN generator 55, a Q-channel PN generator 56, two clock units 57a and 57b, an I-channel demodulator 58a, a Q-channel demodulator 58b, and two Viterbi decoders 59a and 59b.

In the demodulator in FIG. 1B, first and second spread spectrum signals of intermediate frequency (IF) are produced by using two carrier signals with a $\pi/2$ phase difference. The autocorrelation between the first spread spectrum signal and the first PN signal is obtained to produce a first correlated signal, and the autocorrelation between the second spread spectrum signal and the second PN signal is obtained to produce a second correlated signal. By using the difference between the first and second correlated signals, a sync signal of the PN signals is generated. The demodulated signals in a narrow band of frequencies are produced by multiplying the IF spread spectrum signals by the synchronized PN signals, and the carrier signal component is eliminated from the demodulated signals, so that the I-channel and Q-channel data is reproduced.

"Spread Spectrum Communication System" page 280 by M. Yokoyama, published by Kagaku Gijutsu Publishing Company of Japan on May 20, 1988, discloses a Costas-loop type spread spectrum communication system in which a synchronizing demodulator called the Costas loop is used. This synchronizing demodulator is a composite phase locked loop for demodulating a suppressed carrier signal, and it has as input a frequency modulated (FM) signal or a phase modulated (PM) signal, and the carrier reproduction and the data signal demodulation are carried out by using the input signal.

The conventional spread spectrum communication systems mentioned above are of this type, and it is necessary that each of the transmitter and receiver in the system of this type has a phase shifter, a power synthesizer, a power distributor and two PN generators. Thus the conventional systems require a complicated structure, and the manufacturing cost becomes high.

FIG. 2 shows a typical carrier reproducing circuit in which a modified Costas loop is used. This carrier reproducing circuit carries out multilevel quadrature amplitude modulation (QAM). The carrier reproducing circuit in FIG. 2 includes two multipliers 61a and 61b, a $\pi/2$ phase shifter 62, two multilevel discriminators 63a and 63b, two exclusive-OR circuits (EXOR) 64a and 64b, a difference circuit 65, a low-pass filter (LPF) 66, and a voltage-controlled oscillator (VCO) 67.

As described above, in order to transmit two-channel information signals with the conventional spread spectrum communication systems described above, it was necessary that each of the transmitter and the receiver has two PN generators which generate two kinds of PN signals with a small crosscorrelation. In order to reduce the interference between the two PN signals modulated by the two-channel information, it was necessary that two carrier signals with a $\pi/2$ phase difference are used. There is another conventional spread spectrum communication system which uses the two carrier signals with a $\pi/2$ phase difference. However, there still remain the problems in that both the transmitter and the receiver of the conventional system require two or more PN generators to produce a signal to be transmitted, and that the radio frequency part of the system requires the phase shifter, the power synthesizer and the power distributor. Thus, the conventional systems described above require a complicated structure, and the manufacturing cost becomes high.

SUMMARY OF THE INVENTION

Accordingly, it is a general object of the present invention to provide an improved spread spectrum communication system in which the above mentioned problems are eliminated.

Another, more specific object of the present invention is to provide a spread spectrum communication system in which each of the transmitter and the receiver requires only one pseudonoise generator and the radio frequency part of the system has a simple structure, and in which the rate of transmission of data signals is increased with a high reliability.

Another other object of the present invention is to provide a spread spectrum communication system in which the interference between the two spread spectrum signals is eliminated by making use of an improved combination of two pseudonoise signals.

Another object of the present invention is to provide a spread spectrum communication system in which the delay discrimination characteristic of the sync signal is linear in a wider range of frequencies.

The above mentioned objects of the present invention are achieved by a spread spectrum communication system which includes a transmitter and a receiver responsive to a signal transmitted by the transmitter, the transmitter including: a pseudonoise signal generator for generating a pseudonoise signal in accordance with a clock signal; a second pseudonoise signal part for generating a Manchester coded pseudonoise signal by multiplying the pseudonoise signal output from the pseudonoise signal generator by the clock signal; a first modulation part for generating a first spread spectrum signal by multiplying the pseudonoise signal output from the pseudonoise signal generator by a first data signal indicating first information; a second modulation part for generating a second spread spectrum signal by multiplying the Manchester coded pseudonoise signal output from the second pseudonoise signal part by a second data signal indicating second information; and a synthesizing part for producing a signal to be transmitted, by adding the first spread spectrum signal output from the first modulation part to the second spread spectrum signal output from the second modulation part.

The above mentioned objects of the present invention are also achieved by a spread spectrum communication system which includes a transmitter and a receiver responsive to a signal transmitted by the transmitter, the transmitter including: a pseudonoise signal generator for generating a pseudonoise signal in accordance with a clock signal; a first delay part for generating a half-chip delayed pseudonoise signal by delaying the pseudonoise signal output from the pseudonoise signal generator; a second delay part for generating a one-chip delayed pseudonoise signal by delaying the half-chip delayed pseudonoise signal output from the first delay part; a first pseudonoise signal part for generating a sum pseudonoise signal as the sum of the pseudonoise signal output from the pseudonoise signal generator and the one-chip delayed pseudonoise signal output from the second delay part; a first modulation part for generating a first spread spectrum signal by multiplying the half-chip delayed pseudonoise signal output from the first delay part by a first data signal indicating first information; a second modulation part for generating a second spread spectrum signal by multiplying the sum pseudonoise signal output from the first pseudonoise signal part by a second data signal indicating second information; and a synthesizing part for generating a signal to be transmitted, by adding the first spread spectrum signal output from the first modulation part to the second spread spectrum signal output from the second modulation part.

The above mentioned objects of the present invention are also achieved by a spread spectrum communication system which includes a transmitter and a receiver responsive to a signal transmitted by the transmitter, the transmitter including: a pseudonoise signal generator for generating a pseudonoise signal in accordance with a clock signal; a first delay part for generating a half-chip delayed pseudonoise signal by delaying the pseudonoise signal output from the pseudonoise signal generator; a second delay part for generating a one-chip delayed pseudonoise signal by delaying the half-chip delayed pseudonoise signal output from the first delay part; a second pseudonoise signal part for generating a difference pseudonoise signal as the difference between the pseudonoise signal output from the pseudonoise signal generator and the one-chip delayed pseudonoise signal output from the second delay part; a first modulation part for generating a first spread spectrum signal by multiplying the half-chip delayed pseudonoise signal output from the first delay part by a first data signal indicating first information; a second modulation part for generating a second spread spectrum signal by multiplying the difference pseudonoise signal output from the second pseudonoise signal part by a second data signal indicating second information; and a synthesizing part for generating a signal to be transmitted, by adding the first spread spectrum signal output from the first modulation part to the second spread spectrum signal output from the second modulation part.

According to the present invention, both the transmitter and the receiver can be constructed with only one PN generator, and the power synthesis and distribution are carried out with the baseband signals or intermediate frequency signals. The radio frequency part of the system has only the task of the frequency conversion, and the structure of the system can be very simple. Therefore, the manufacturing cost can be reduced and the spread spectrum communication can be efficiently and stably carried out. According to the present invention, the maximum amplitude of the sync signal is increased, and the delay discrimination characteristic of the sync signal is linear in a wider range of frequencies near the synchronization point. Thus, the synchronization function of the receiver of the spread spectrum communication system can be more stable.

BRIEF DESCRIPTION OF THE DRAWINGS

The above and other objects, features and advantages of the present invention will be more apparent from the following detailed description when read in conjunction with the accompanying drawings in which:

FIGS. 1A and 1B are block diagrams showing a modulator and a demodulator of a known spread spectrum communication system;

FIGS. 3A and 3B are block diagrams showing a transmitter and a receiver of a spread spectrum communication system to which the present invention is applied;

FIG. 12 is a block diagram showing a receiver of a fourth embodiment of the present invention;

FIGS. 13A through 13D are charts showing the pseudonoise signal, the Manchester coded pseudonoise signal, and the two signals relating to the sum of the two pseudonoise signals and to the difference thereof;

FIG. 19 is a block diagram showing a transmitter in the spread spectrum communication system of the fourth embodiment;

FIG. 20 is a block diagram showing a modified transmitter in the spread spectrum communication system of the fourth embodiment;

FIG. 21 is a block diagram showing modification of the receiver of the fourth embodiment;

FIGS. 23A and 23B are block diagrams showing a transmitter and a receiver of a sixth embodiment of the present invention;

FIGS. 24A and 24B are block diagrams showing a transmitter and a receiver of a seventh embodiment of the present invention.

DESCRIPTION OF THE PREFERRED EMBODIMENTS

Figure 1A:
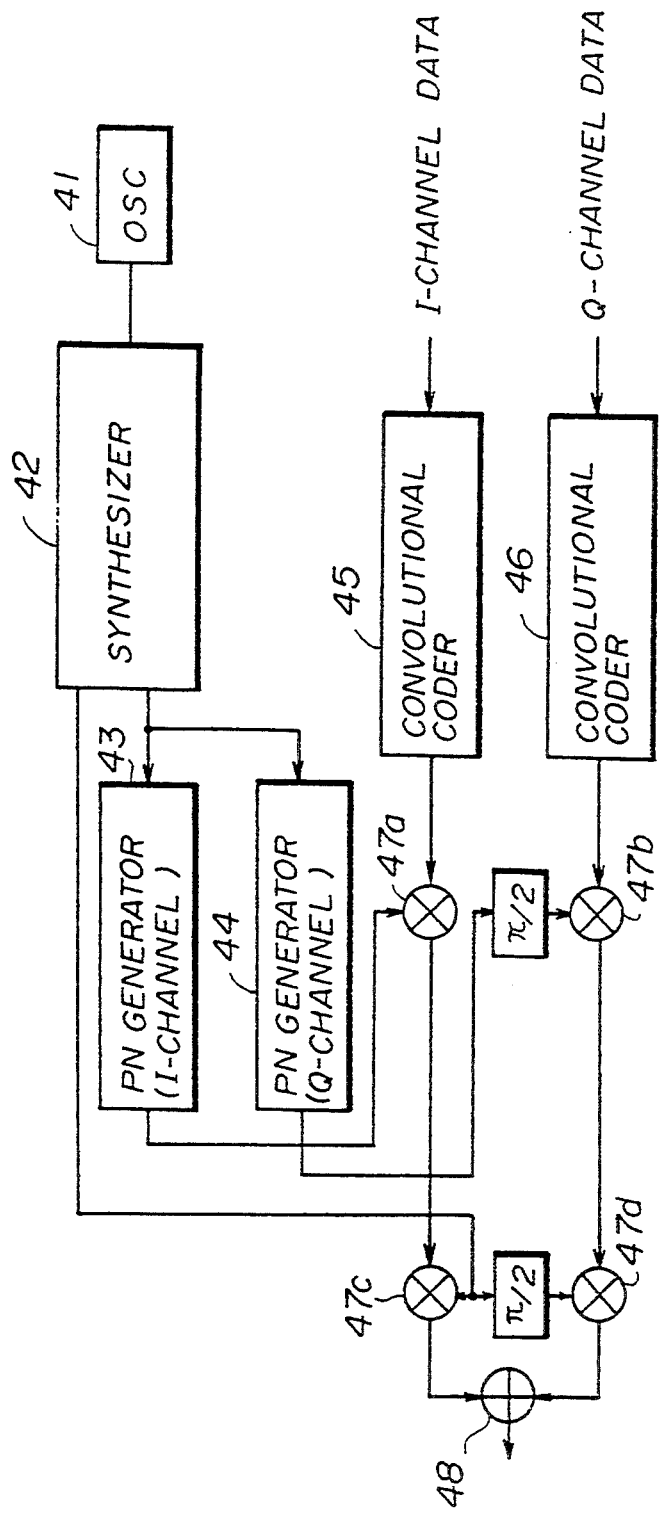
Figure 2:
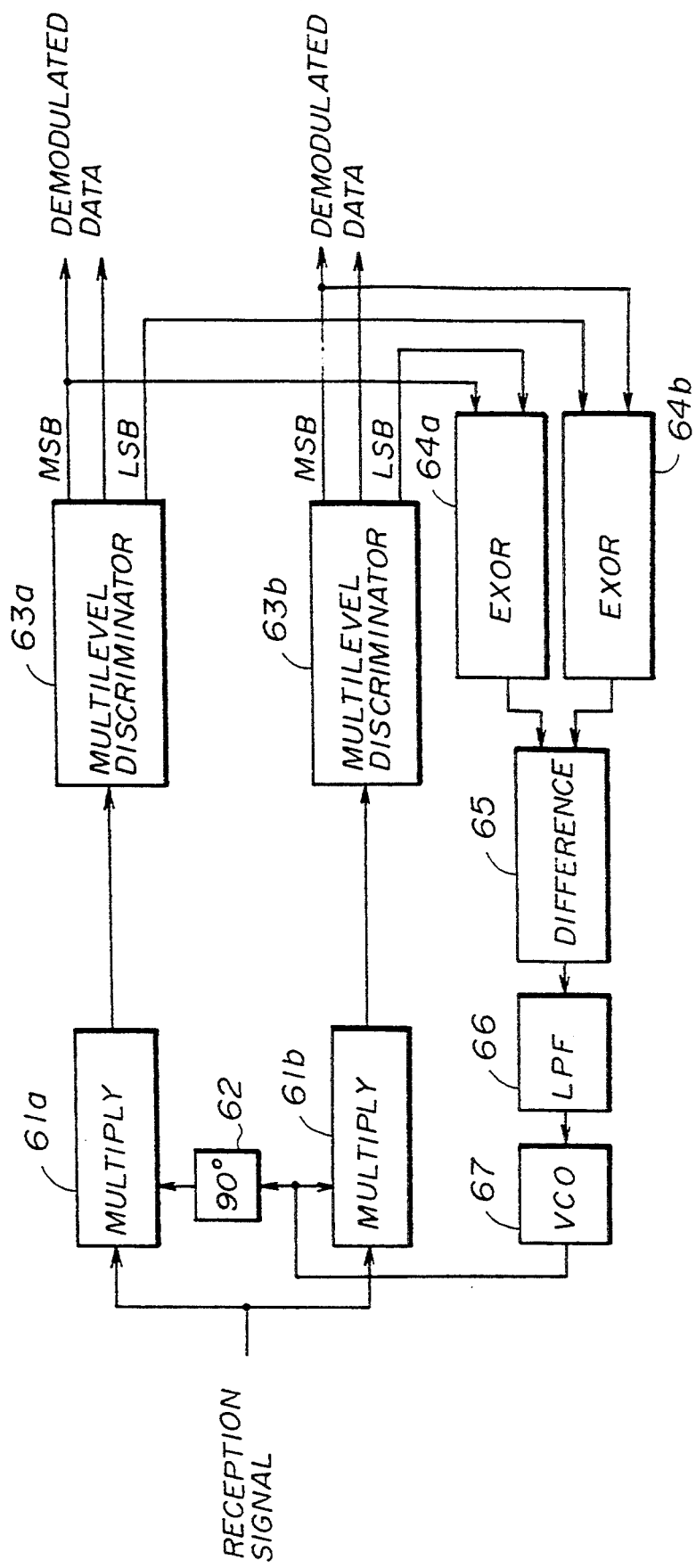
FIG. 2 is a block diagram showing a carrier reproducing unit of a known spread spectrum demodulator.

A description will now be given, with reference to FIGS. 3A through 6E, of a first embodiment of a spread spectrum communication system according to the present invention.

FIG. 3A shows a transmitter of this spread spectrum communication system. This transmitter includes a pseudonoise (PN) generator 1, three multipliers 2a through 2c, and an adder 3. FIG. 3B shows a receiver of the spread spectrum communication system. This receiver includes four multipliers 4a through 4d, a pseudonoise (PN) generator 5, two low-pass filters (LPF) 6a and 6b, a voltage-controlled oscillator (VCO) 7, and a loop filter 8. The spread spectrum transmitter and receiver shown in FIGS. 3A and 3B perform the modulation and demodulation with the two baseband pseudonoise signals.

In the spread spectrum communication system in FIGS. 3A and 3B, the spread spectrum communication is performed in which a signal to be transmitted is produced by using a pseudonoise (PN) signal modulated by first information and a Manchester coded pseudonoise (MPN) signal modulated by second information.

Figures 4A, 4B:
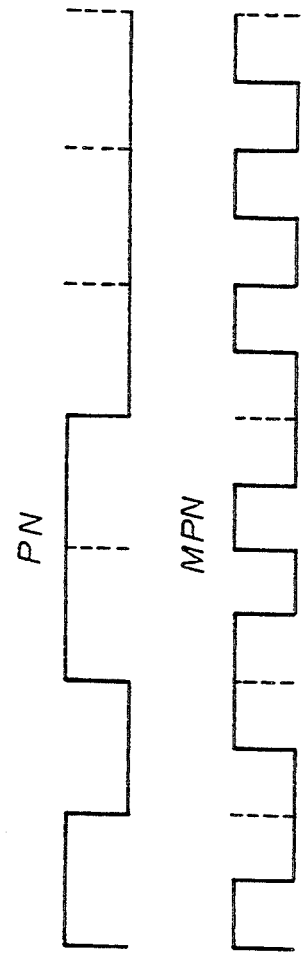
FIGS. 4A and 4B are charts showing a pseudonoise signal and a Manchester coded pseudonoise signal used by the spread spectrum communication system in FIGS. 3A and 3B.

FIG. 4A shows the pulse form of the PN signal, and FIG. 4B shows the pulse form of the MPN signal. In the spread spectrum communication system of the present invention, a first spread spectrum (SS) signal is generated by modulating the PN signal in accordance with the first data signal indicating first information, and a second spread spectrum (SS) signal is generated by modulating the MPN signal in accordance with a second data signal indicating second information. A signal to be transmitted is produced by adding the first SS signal to the second SS signal, and this signal is transmitted from the transmitter to the receiver.

The Manchester coding is a known coding method for producing a MPN signal. In the Manchester coded pseudonoise (MPN) signal in FIG. 4B, a code [1, 0] is assigned to data corresponding to a code [1] of the PN signal in FIG. 4A, and a code [0, 1] is assigned to data corresponding to a code [0] of the PN signal. The PN signal sequences in the following embodiments include M-sequence, G-sequence and K-sequence. It is necessary that the PN signal sequence used by the transmitter accords with the PN signal sequence used by the receiver.

In the transmitter in FIG. 3A, a clock signal output from an oscillator is input to the PN generator 1, so that the PN generator 1 generates a PN signal in accordance with the clock signal as shown in FIG. 4A. The PN signal output from the PN generator 1 is multiplied at the multiplier 2b by the clock signal, so that an MPN signal as shown in FIG. 4B is generated at the output of the multiplier 2b.

The first data signal indicating first information and the second data signal indicating second information are supplied to the multipliers 2a and 2c, respectively. The PN signal from the PN generator 1 is multiplied by the first data signal at the multiplier 2a, and a multiplied signal output from the multiplier 2a is input to the adder 3. The MPN signal is multiplied by the second data signal at the multiplier 2c, and a multiplied signal output from the multiplier 2c is input to the adder 3. Thus, the signal to be transmitted is produced at the output of the adder 3 by adding the multiplied signal from the multiplier 2a to the multiplied signal from the multiplier 2c. This signal is transmitted by the transmitter in FIG. 3A via a transmission path.

The receiver shown in FIG. 3B receives the transmitted signal from the transmitter via a transmission path, and it reproduces the first and second information from the received signal. In the receiver in FIG. 3B, a clock signal output from the VCO 7 is supplied to the input of the PN generator 5, so that a PN signal is generated by the PN generator 5 in accordance with the clock signal. The sequence of the PN signal output from the PN generator 5 is the same as that output from the PN generator 1 in the transmitter in FIG. 3A. The PN signal output from the PN generator 5 is multiplied at the multiplier 4b by the clock signal output from the VCO 7, so that an MPN signal is generated at the output of the multiplier 4b. The sequence of the MPN signal output from the multiplier 4b is the same as that output from the multiplier 2b in the transmitter in FIG. 3A.

The transmitted signal received from the transmitter is supplied to each of the multipliers 4a and 4c. A PN signal from the PN generator 5 is multiplied by the transmitted signal at the multiplier 4a, and the multiplied signal output from the multiplier 4a is passed through the LPF 6a to produce a correlated signal of the PN signal at point "I" of the receiver. A MPN signal output from the multiplier 4b is multiplied by the transmitted signal at the multiplier 4c, and the multiplied signal output from the multiplier 4c is passed through the LPF 6b to produce a correlated signal of the MPN signal at point "Q" of the receiver.

Figure 5A:
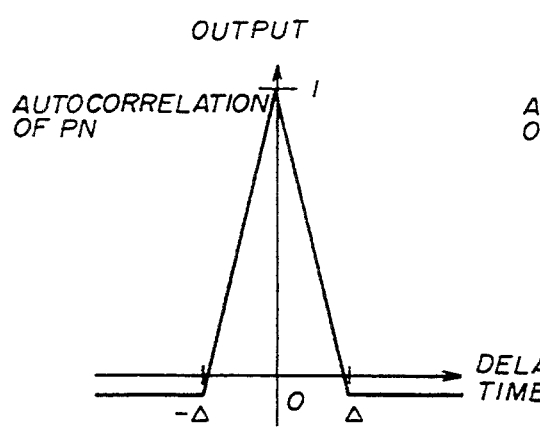
FIGS. 5A, 5B and 5C are charts showing the autocorrelation of the pseudonoise signal, the autocorrelation of the Manchester coded pseudonoise signal, and the crosscorrelation of the two pseudonoise signals.
Figure 5B:
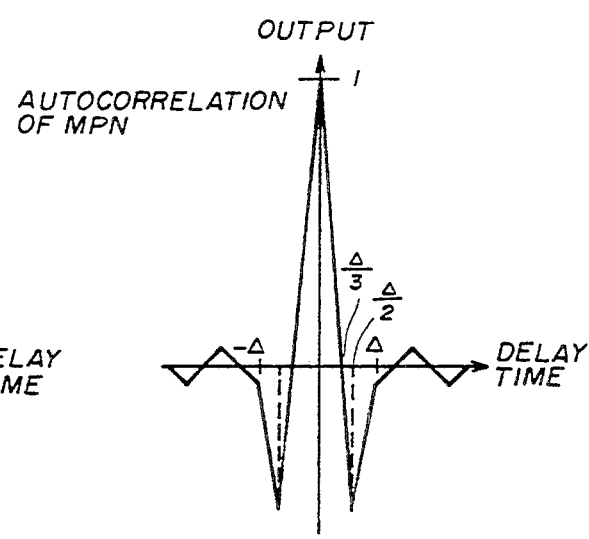
Figure 5C:
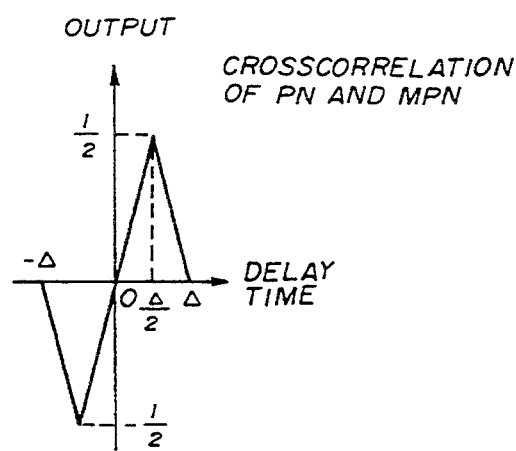

FIG. 5A shows the autocorrelation of the PN signal, FIG. 5B shows the autocorrelation of the MPN signal, and FIG. 5C shows the crosscorrelation of the PN and MPN signals. In each of these figures, the relationship between the delay time and the correlation output is shown. When the synchronization is reached, the delay time is equal to 0, and the correlation output is equal to 1 in the autocorrelation cases of the PN signal and the MPN signal. However, in the crosscorrelation case, the correlation output is equal to 0 when the synchronization is reached.

A case in which only the PN signal from the transmitter is supplied to the receiver in FIG. 3B will be described, for the sake of convenience. In this case, the signal at point I of the receiver equals the autocorrelation of the PN signal multiplied by the first data signal. As the delay time is equal to zero if the polarity of the locally generated PN signal is synchronized with the polarity of the received signal, the first data signal is reproduced at point I of the receiver. The signal at point Q of the receiver in this case equals the crosscorrelation of the PN and MPN signals multiplied by the first data signal. When the synchronization is reached, the delay time is equal to zero, and the signal at point Q of the receiver is zero.

The two correlated signals output from the LPF 6a and 6b are supplied to the multiplier 4d of the receiver in FIG. 3B. The multiplied signal (which indicates the product of the signal at point I and the signal at point Q) output from the multiplier 4d is supplied to the VCO 7 through the loop filter 8. The loop filter 8 supplies the direct current component of the multiplied signal to the VCO 7.

Figure 6A:
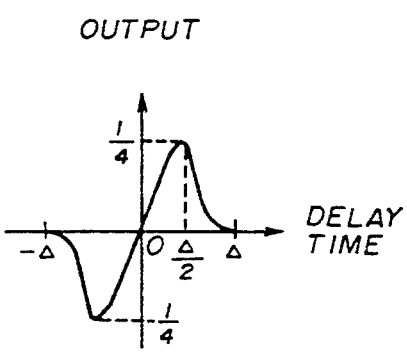
FIGS. 6A through 6E are charts showing several correlation characteristics of multiplied signals at the output of a loop filter of the receiver.

FIG. 6A shows the correlation characteristic of a multiplied signal at the output of the loop filter of the receiver. The multiplied signal is produced by multiplying the autocorrelation of the PN signal (FIG. 5A) by the crosscorrelation of the PN and MPN signals (FIG. 5C). It should be noted that in producing the multiplied signal the first data signal is included twice in the multiplication. Thus, the multiplied correlation characteristic in the present case is not influenced by the first data signal.

Another case, in which, for the sake of convenience, only the MPN signal from the transmitter is supplied to the receiver in FIG. 3B will be described. The signal at point I of the receiver in this case indicates the crosscorrelation (FIG. 5C) of the PN and MPN signals multiplied by the second data signal. When synchronization is reached, the delay time is equal to zero, and the signal appearing at point I of the receiver is zero. The signal at point Q of the receiver indicates the autocorrelation (FIG. 5B) of the MPN signal multiplied by the second data signal. As the delay time is equal to zero if synchronization is reached, the second data signal is reproduced at point Q of the receiver. The direct current component of the multiplied signal (which indicates the product of the signal at point Q and the zero-value signal at point I) is supplied from the loop filter 8 to the VCO 7.

Figure 6B:
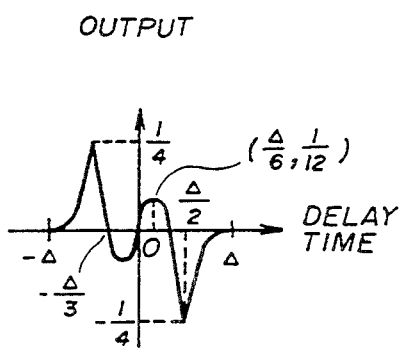

FIG. 6B shows the correlation characteristic of a multiplied signal at the output of the loop filter. The multiplied signal is produced by multiplying the autocorrelation of the MPN signal (FIG. 5B) by the crosscorrelation of the PN and MPN signals (FIG. 5C). It should be noted that in producing the multiplied signal the second data signal is included twice in the multiplication. Thus, the combined correlation characteristic in this case is not influenced by the second data signal.

Figure 6C:
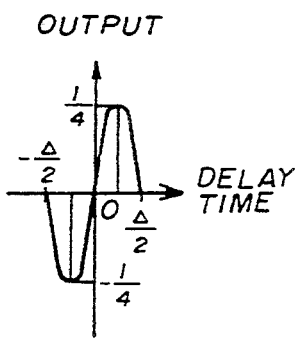

However, in actual cases, both the PN signal and the MPN signal are respectively modulated in accordance with the first data signal and the second data signal, and the multiplied signal including the modulated PN and MPN signals is supplied from the transmitter to the receiver. The signal at the output of the loop filter 8 in such cases indicates the correlation characteristic of the multiplied signal. FIG. 6C shows the correlation characteristic of this multiplied signal at the output of the loop filter 8 of the receiver. The multiplied signal at the output of the loop filter 8 is supplied to the voltage controlled oscillator 7 as a sync signal to control the frequency at which a clock signal is generated by the VCO 7. When synchronization is reached, the delay time is equal to 0. The first information can be reproduced at point I of the receiver at the time of synchronization. The second information can be reproduced at point Q of the receiver at the time of synchronization.

Practically, the interference between the two pseudonoise signals multiplied by the first and second data signals may become a significant problem. The multiplied signal including the modulated PN and MPN signals is supplied to the receiver, but it is difficult to correctly and efficiently reproduce the first and second information if the above mentioned interference is significantly great. There are two actual cases in which the interference between the PN and MPN signals is significantly great.

Figure 6E:
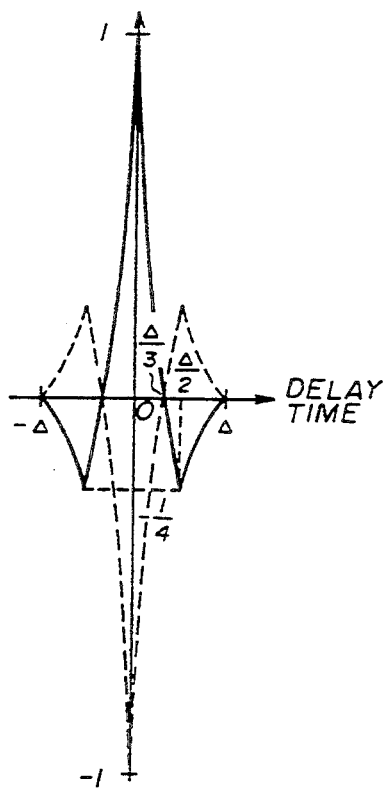
Figure 6D:
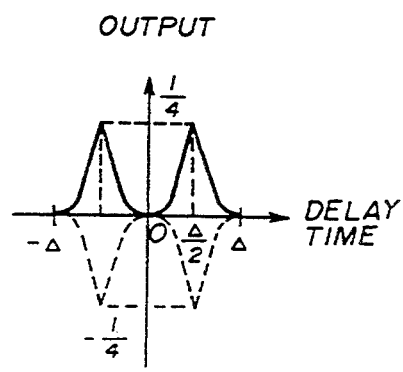

In one of the actual cases, the signal at point I of the receiver indicates the cross-correlation (FIG. 5C) of the MPN and PN signals multiplied by the first data signal and the signal at point Q of the receiver indicates the crosscorrelation (FIG. 5C) of the PN and MPN signals multiplied by the second data signal. FIG. 6D shows the correlation characteristic of the multiplied signal at the output of the loop filter 8 of the receiver. The multiplied signal in FIG. 6D is produced by multiplying the cross-correlation characteristic of FIG. 5C by itself. The polarity of the correlation characteristic in FIG. 6D may be inverted in accordance with the input information. The inverted correlation characteristic is indicated by a dotted line in FIG. 6D.

In the case of FIG. 6D, the interference between the two pseudonoise signals multiplied by the first and second data signals when the synchronization is reached can be eliminated because the delay time on this occasion is equal to 0 and the correlation characteristic is regarded as zero value.

In the other actual case, the signal at point I of the receiver indicates the autocorrelation (FIG. 5A) of the PN and PN signals multiplied by the first data signal and the signal at point Q of the receiver indicates the autocorrelation (FIG. 5B) of the MPN and MPN signals multiplied by the second data signal. FIG. 6E shows the correlation characteristic of the multiplied signal at the output of the loop filter 8 of the receiver. The signal shown in FIG. 6E is produced by multiplying the autocorrelation characteristic of FIG. 5A by the autocorrelation characteristic of FIG. 5B. The polarity of the correlation characteristic in FIG. 6E may be inverted in accordance with the input information. The inverted correlation characteristic is indicated by a dotted line in FIG. 6E.

In the case of FIG. 6E, the interference between the two pseudonoise signals multiplied by the first and second data signals when synchronization is reached is relatively great. However, the polarity of the first and second signals changes at random between positive and negative states. The delay time when synchronization is reached is equal to 0, and the average of the values of the correlation characteristic can be regarded as being zero. The synchronization control is not significantly influenced by the interference.

In addition, there is another actual case in which the interference between the first and second data signals is relatively great. In order to eliminate the interference between the two data signals, at least one of the two data signals indicating the first and second information is subjected to the Manchester coding to produce a Manchester coded signal as shown in FIG. 4B, and such data signals are supplied to the transmitter of the spread spectrum communication system of the present invention.

Next, a description will be given, with reference to FIGS. 7A and 7B, of a second embodiment of the present invention. The spread spectrum communication system of this embodiment carries out radio communication by making use of the two pseudonoise signals.

Figure 7A:
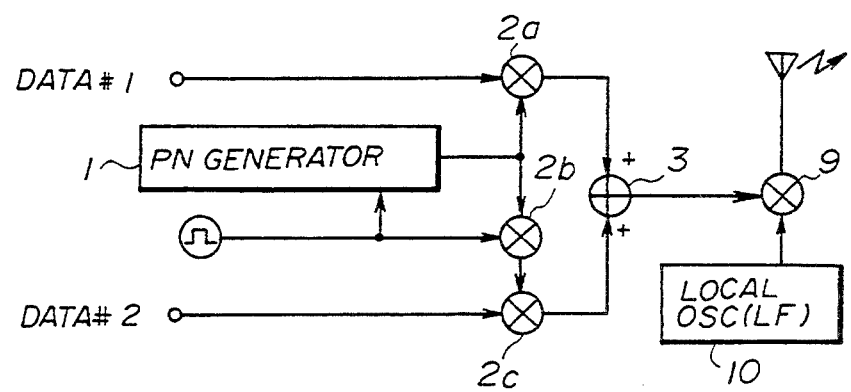
FIGS. 7A and 7B are block diagrams showing a transmitter and a receiver of a second embodiment of the present invention.
Figure 7B:
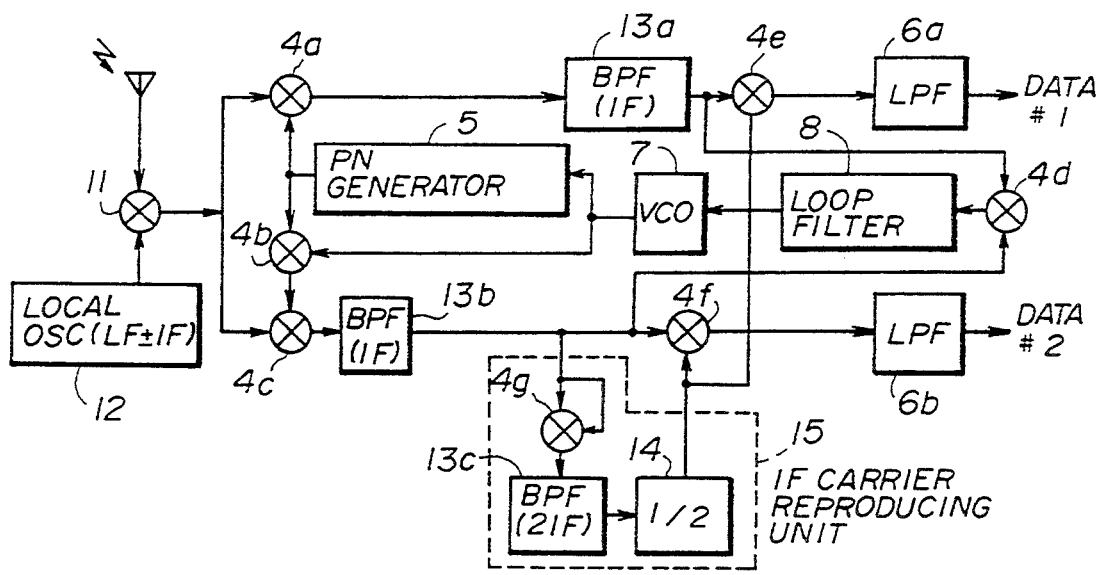

FIG. 7A shows a transmitter of the spread spectrum communication system of the second embodiment, and FIG. 7B shows a receiver of this spread spectrum communication system. In FIGS. 7A and 7B, the parts which are the same as corresponding parts in FIGS. 3A and 3B are designated by the same reference numerals, and a description thereof will be omitted.

The transmitter in FIG. 7A is essentially the same as the transmitter in FIG. 3A, but the former differs from the latter in that the transmitter in FIG. 7A includes a multiplier 9 connected at its input to the adder 3 and connected at its output to an antenna, and in that a local oscillator 10 is connected to the multiplier 9. A carrier signal of local frequency (LF) generated by the local oscillator 10 is input to the multiplier 9. The multiplier 9 multiplies the signal output from the adder 3 by the carrier signal output from the local oscillator 10, and the multiplied signal output from the multiplier 9 has an appropriate frequency for radio communication.

The receiver of the second embodiment in FIG. 7B differs from the receiver in FIG. 3B in several aspects. In addition to the parts of the receiver of FIG. 3B, the receiver of FIG. 7B includes a multiplier 11 connected to an antenna, a local oscillator 12 connected to an input of the multiplier 11, three band-pass filters (BPF) 13a through 13c, a frequency divider ($\frac{1}{2}$) 14, three multipliers 4e through 4g, and an intermediate-frequency (IF) carrier reproducing unit 15. In order to produce intermediate-frequency correlated signals, the local oscillator 12 supplies a carrier signal of a local frequency (which frequency equals the transmitter local frequency LF plus or minus a receiver intermediate frequency IF) to the multiplier 11, and the multiplier 11 multiplies the transmitted signal received at the antenna by the carrier signal from the local oscillator 12.

In the receiver in FIG. 7B, the signal output from the multiplier 11 is multiplied at the multiplier 4a by the PN signal from the PN generator 5, and a multiplied signal is passed through the BPF 13a to produce a first intermediate-frequency correlated signal. The signal output from the multiplier 11 is multiplied at the multiplier 4c by the MPN signal from the multiplier 4b, and a multiplied signal is passed through the BPF 13b to produce a second intermediate-frequency correlated signal. The two correlated signals include the data signal component and the IF carrier signal component.

The carrier signal component of the correlated signals is supplied to the loop filter 8 twice, and the signal at the output of the loop filter 8 indicates the carrier signal component and the direct current component. As the signal at the output of the loop filter 8 has similar correlation characteristics to those shown in FIGS. 6A through 6E, a sync signal is supplied from the loop filter 8 to the VCO 7 in a manner similar to the manner of the receiver in FIG. 3B.

In order to reproduce the first and second information from the correlated signals by eliminating the carrier signal component, it is necessary to reproduce the carrier signal by means of the IF carrier reproducing unit 15. In the carrier reproducing unit 15, one of the two correlated signals (which is either the first correlated signal or the second correlated signal) is multiplied by itself, and the multiplied signal is passed through the band-pass filter 13c. In this example, the second correlated signal is multiplied by itself. The band-pass filter 13c outputs a second harmonic frequency signal (whose frequency equals 2·IF) only. The signal from the BPF 13c is passed through the frequency divider ($\frac{1}{2}$) 14 to reproduce the carrier signal at the output of the frequency divider 14.

In the receiver in FIG. 7B, the first correlated signal from the BPF 13a is multiplied at the multiplier 4e by the signal from the frequency divider 14, and a multiplied signal from the multiplier 4e is passed through the LPF 6a to reproduce the first information from the first correlated signal. The second correlated signal from the BPF 13b is multiplied at the multiplier 4f by the signal from the frequency divider 14, and a multiplied signal from the multiplier 4f is passed through the LPF 6b to reproduce the second information from the second correlated signal.

Figure 8A:
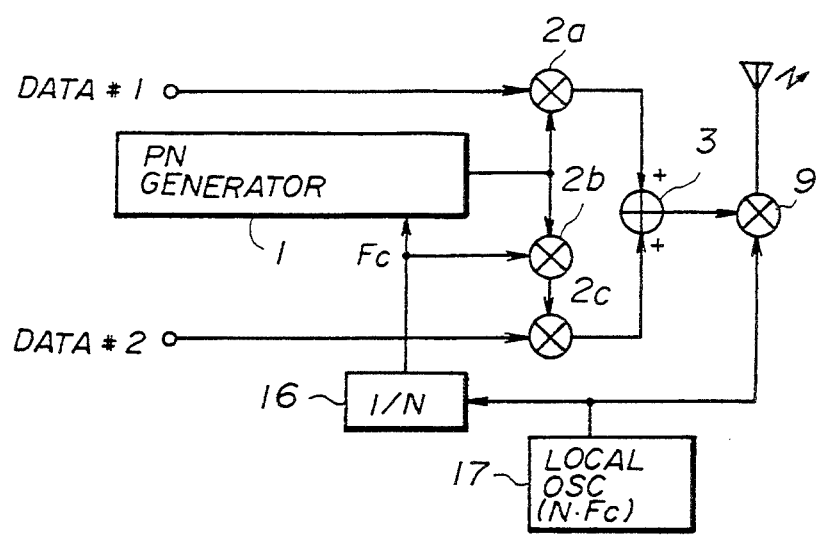
FIGS. 8A and 8B are block diagrams showing a transmitter and a receiver of a third embodiment of the present invention.
Figure 8B:
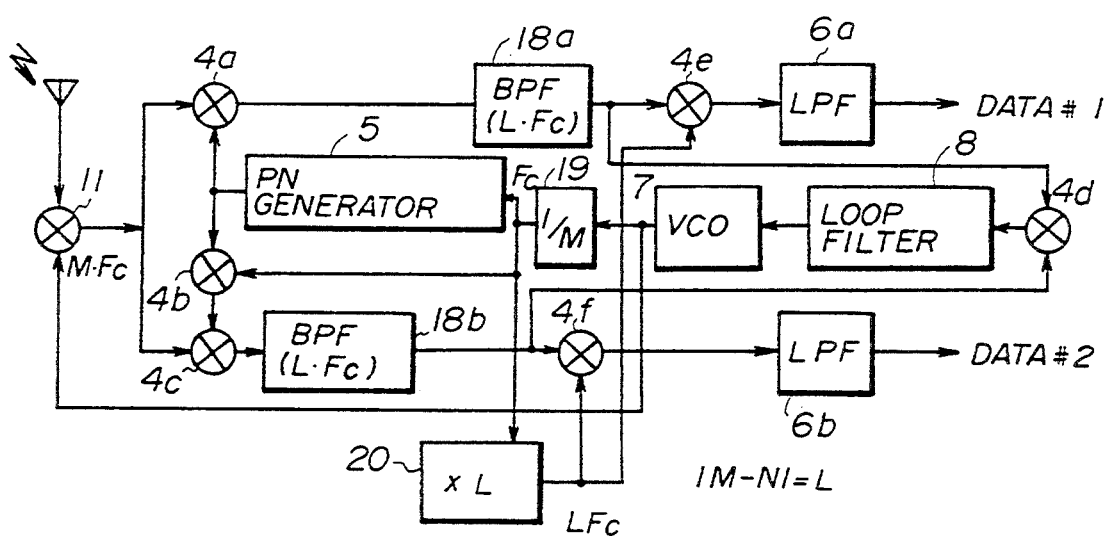

Next, a description will be given, with reference to FIGS. 8A and 8B, of a third embodiment of the present invention. FIG. 8A shows a transmitter of the spread spectrum communication system of the third embodiment, and FIG. 8B shows a receiver of this spread spectrum communication system. In FIGS. 8A and 8B, the parts which are the same as corresponding parts in FIGS. 3A and 3B are designated by the same reference numerals.

The transmitter in FIG. 8A includes a 1/N frequency divider 16 and a local oscillator 17. The divider 16 is connected to the PN generator 1 and to the multiplier 2b. The local oscillator 17 generates a clock signal of oscillation frequency N·Fc, and this clock signal is supplied to the divider 16 and to the multiplier 9. The divider 16 supplies the clock signal of divided frequency Fc to the PN generator 1 and to the multiplier 2b. The PN generator 1 generates the PN signal in accordance with this clock signal.

The receiver in FIG. 8B includes two band-pass filters (BPF) 18a and 18b, a 1/M frequency divider 19, an L frequency multiplier 20, and the two multipliers 4e and 4f. In FIG. 8B, the voltage-controlled oscillator (VCO) 7 generates a clock signal of oscillation frequency M·Fc, and this clock signal is supplied to the multiplier 11 and to the divider 19. The divider 19 outputs the clock signal of divided frequency Fc to the PN generator 5. The PN generator 5 generates the PN signal in accordance with the clock signal of divided frequency Fc. The clock signal from the divider 19 is supplied to the multiplier 4b and to the frequency multiplier 20. The frequency multiplier 20 outputs the clock signal of multiplied frequency L·Fc to the multiplier 4e, where L=|M−N|. The clock signal of intermediate frequency L·Fc output from the frequency multiplier 20 is multiplied at the multiplier 4e by the signal output from the BPF 18a. Since the clock signal is synchronous with the carrier signal, the receiver in FIG. 8B does not require a carrier reproducing unit such as the IF carrier reproducing unit shown in FIG. 7B.

Figure 9:
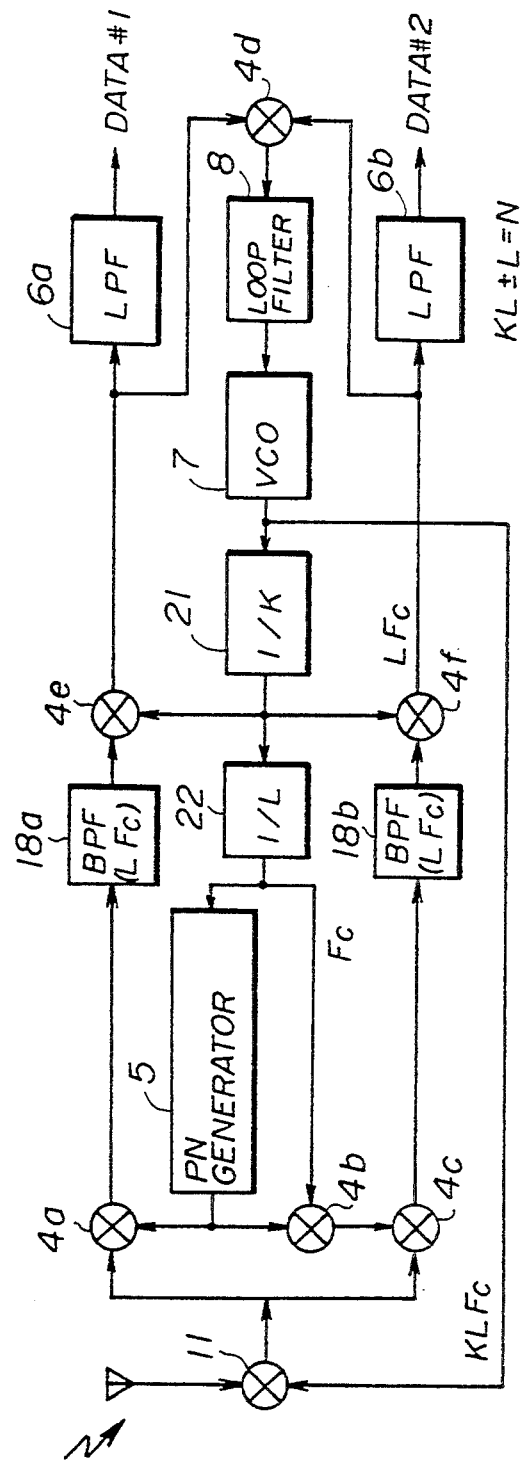
FIGS. 9 and 10 are block diagrams showing modifications of the receiver of the spread spectrum communication system of the third embodiment.

FIG. 9 shows a modified receiver in the spread spectrum communication system of the third embodiment. The receiver in FIG. 9 includes a 1/K frequency divider 21 and a 1/L frequency divider 22, and it receives the transmitted signal from the transmitter shown in FIG. 8A. In FIG. 9, the parts which are the same as corresponding parts in FIG. 8B are designated by the same reference numerals.

The receiver in FIG. 9 uses the frequency divider instead of the frequency multiplier 20 shown in FIG. 8B. A clock signal of oscillation frequency KLFc generated by the VCO 7 is supplied to the multiplier 11 and to the 1/K frequency divider 21. The divider 21 outputs the clock signal of divided frequency LFc to the divider 22 and to the multipliers 4e and 4f. The signal output from the divider 21 is used at the multipliers 4e and 4f as the IF carrier signal. The frequency divider 22 outputs the clock signal of divided frequency Fc to the PN generator 5 and to the multiplier 4b. The PN generator 5 generates the PN signal in accordance with the clock signal of divided frequency Fc from the divider 22, where N is equal to (KL+L) or (KL−L).

Figure 10:
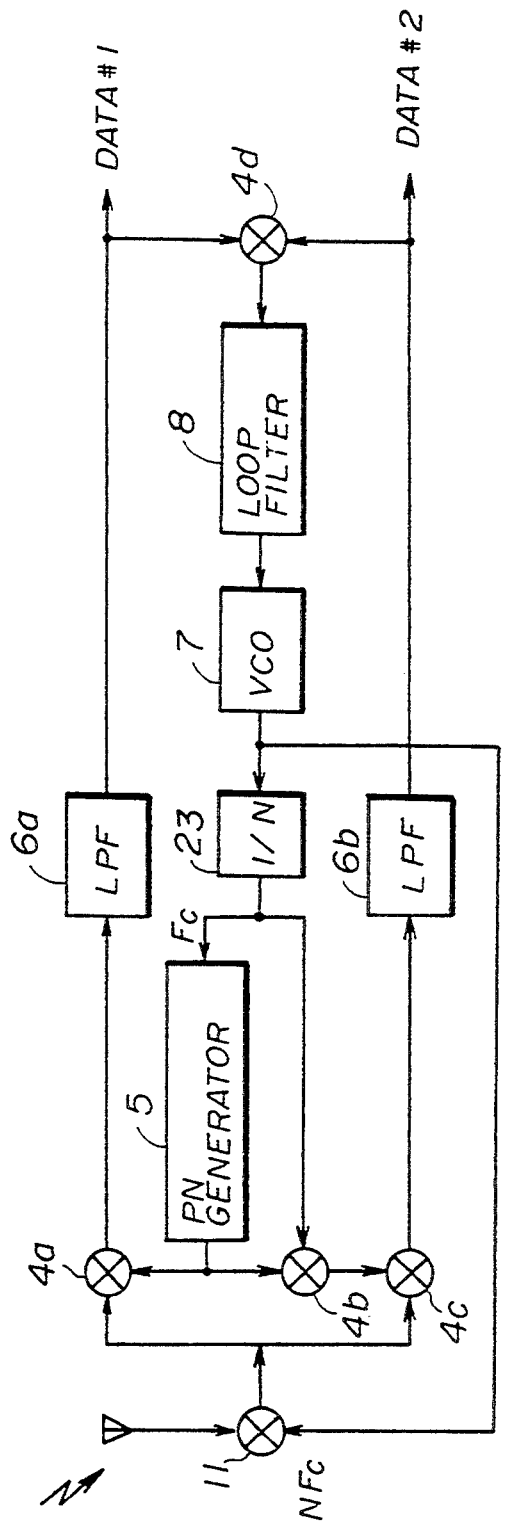

FIG. 10 shows another modified receiver in the spread spectrum communication system of the third embodiment. The receiver in FIG. 10 includes a 1/N frequency divider 23. In FIG. 10, the parts which are the same as corresponding parts in FIG. 9 are designated by the same reference numerals.

The receiver in FIG. 10 uses a carrier signal whose frequency is equal to zero. A clock signal of oscillation frequency NFc generated by the VCO 7 is supplied to the multiplier 11 and to the 1/N frequency divider 23. The divider 23 outputs the clock signal of divided frequency Fc to the PN generator 5 and to the multiplier 4b. The PN generator 5 generates the PN signal in accordance with the clock signal of divided frequency Fc output from the divider 23.

The receiver in FIG. 10 is similar to the receiver in FIG. 3B, and the structure of this receiver is simple because it uses no intermediate frequency signal. In the radio frequency part of the receiver in FIG. 10, the transmitted signals received from the transmitter are converted into baseband signals. The correlated signals are respectively passed through the LPF 6a and the LPF 6b to reproduce the first data signal and the second data signal.

Figure 11:
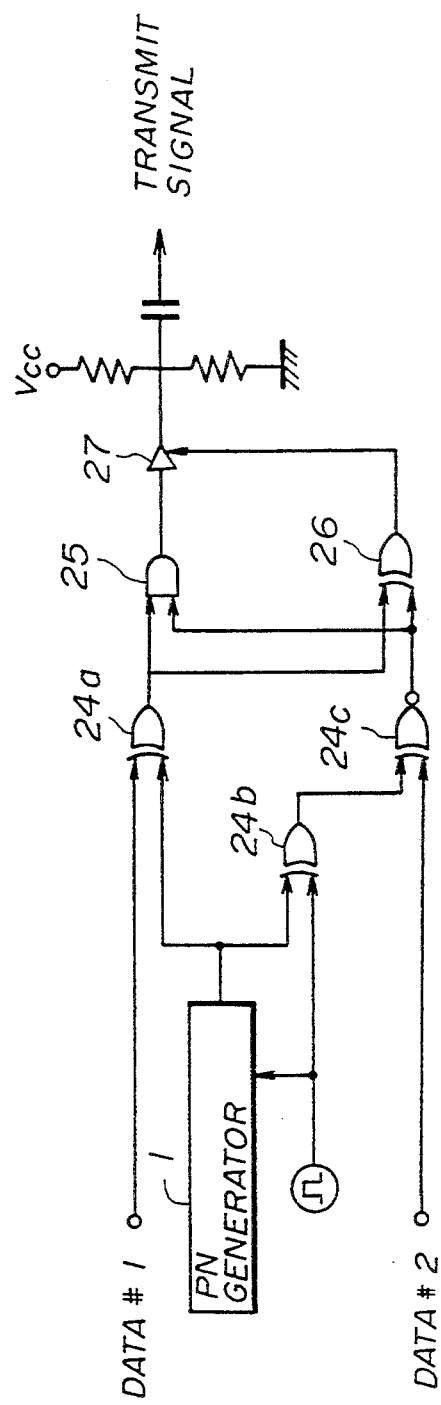
FIG. 11 is a block diagram showing a modified transmitter of the spread spectrum communication system of the third embodiment.

FIG. 11 shows a modified transmitter in the spread spectrum communication system of the third embodiment. The transmitter in FIG. 11 includes three exclusive-OR (EXOR) circuits 24a, 24b and 24c, an AND circuit 25, an exclusive-OR (EXOR) circuit 26, and a tri-state buffer 27. In FIG. 11, the PN generator 1 is essentially the same as the corresponding PN generator of the transmitter in FIG. 3A or 8A.

The transmitter in FIG. 11 is constructed using digital circuit elements and has a simple structure for the purpose of reducing the manufacturing cost. The transmitted signal from the transmitter of the first and second embodiments described above indicates one of three distinct values −2, 0 and +2 if each of the input first and second data signals indicates one of two values −1 and +1. Thus, a transmitter achieving the functions which are the same as those of the first and second embodiments can be constructed with the digital circuit elements as shown in FIG. 11, instead of the component parts of the transmitter in FIG. 3A. That is, the multipliers 2a–2c in FIG. 3A are replaced by the EXOR circuits 24a–24c in FIG. 11, and the adder 3 in FIG. 3A is replaced by the AND circuit 25, the EXOR circuit 26 and the tri-state buffer 27. The transmitter in FIG. 11 transmits the signal indicating one of three distinct values if each of the first and second data signals indicating one of two values −1 and +1 are input.

Next, a description will be given, with reference to FIGS. 12 through 15D, of a fourth embodiment of the present invention.

In the previously described embodiments of the spread spectrum communication systems, both the transmitter and the receiver can be constructed using only one PN generator, and the power synthesis and distribution are carried out with signals of baseband frequency or intermediate frequency. The radio frequency part of the system has only the task of frequency conversion, and the structure of the system can be very simple. All the component parts of the transmitter, other than the radio frequency part, can be constructed using digital circuit elements in order to reduce the manufacturing cost of the apparatus.

However, in the previously described embodiments, the delay discrimination characteristic of the sync signal used to control the synchronization is not linear in a certain range of delay time. There is a problem in that the interference between the two spread spectrum signals in a certain case becomes so great that the synchronization is not stably obtained with the sync signal.

In order to eliminate the above mentioned problem, the spread spectrum communication system of the fourth embodiment uses an improved combination of the PN signals so that the above mentioned interference between the two spread spectrum signals can be reduced.

FIG. 12 shows a receiver of the spread spectrum communication system of the fourth embodiment. This receiver is designed so as to have a linear sync signal delay discrimination characteristic.

FIGS. 13A through 13D show the pseudonoise (PN) signal, the Manchester coded pseudonoise (MPN) signal, and the other signals relating to the sum of the two pseudonoise signals and to the difference thereof. FIG. 13C shows a sum pseudonoise (WPN) signal indicating the sum of the ½-chip advanced PN signal and the ½-chip delayed PN signals. FIG. 13D shows a difference pseudonoise (DPN) signal indicating the difference between the ½-chip advanced PN signal and the ½-chip delayed PN signal. In the fourth embodiment, the spread spectrum communication is carried out by making use of these PN signals. The WPN signal shown in FIG. 13C is essentially the same as a WPN signal indicating the sum of the PN signal and a one-chip delayed PN signal, and the DPN signal shown in FIG. 13D is essentially the same as a DPN signal indicating the difference between the PN signal and a one-chip delayed PN signal.

The receiver in FIG. 12 includes two ½-chip delay circuits 31a and 31b and an adder 32. The other parts of this receiver are the same as the corresponding parts of the receiver in FIG. 3B, and they are designated by the same reference numerals.

In the transmitter, the transmitted signal is produced by adding the PN signal modulated by the first data signal to the MPN signal modulated by the second data signal as in the above described embodiments. The transmitted signal from the transmitter is received by the receiver in FIG. 12, and it is supplied to each of the multipliers 4a and 4b.

In the receiver in FIG. 12, a pseudonoise (PN) signal is generated by the PN generator 5, and this PN signal is supplied to the ½-chip delay circuit 31b and to the adder 32. The delay circuit 31b generates a half-chip delayed PN signal, which is supplied from the delay circuit 31b to the ½-chip delay circuit 31a and to the multiplier 4b. The clock signal from the VCO 7 is multiplied at the multiplier 4b by the half-chip delayed PN signal, and the multiplied signal is further multiplied at the multiplier 4c by the received signal to produce a half-chip delayed MPN signal, and this signal is passed through the LPF 6b to reproduce the second data signal at the output of the LPF 6b (at point Q of the receiver).

The delay circuit 31a generates a one-chip delayed PN signal from the half-chip delayed PN signal output from the delay circuit 31b, and the one-chip delayed PN signal is supplied to the adder 32. At the adder 32, the PN signal from the PN generator 5 is added to the one-chip delayed PN signal output from the delay circuit 31a to produce a sum pseudonoise (WPN) signal. The WPN signal output from the adder 32 is multiplied at the multiplier 4a by the received signal to produce a multiplied WPN signal, and this signal is passed through the LPF 6a to reproduce the first information at the output of the LPF 6a in FIG. 12 (at point I of the receiver).

The two correlated signals output from the LPF 6a and 6b are supplied to the multiplier 4d of the receiver in FIG. 12. A multiplied signal output from the multiplier 4d is supplied to the VCO 7 through the loop filter 8. The loop filter 8 supplies the direct current component of the multiplied signal to the VCO 7. The VCO 7 generates a clock signal in accordance with the signal supplied from the loop filter 8, and the PN generator 5 generates the PN signal in accordance with the clock signal supplied from the VCO 7, so that the generated PN signal is synchronized with the received signal.

Figure 14A:
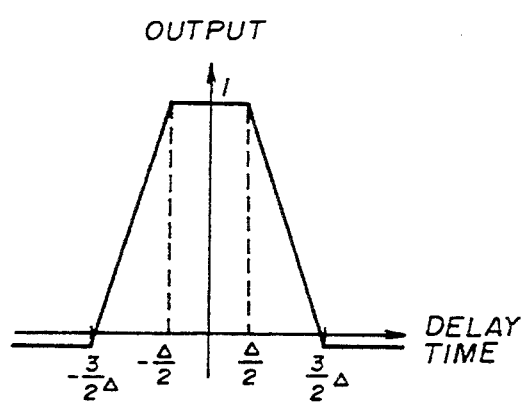
FIGS. 14A through 14D are charts showing the crosscorrelation and autocorrelation relating to the pseudonoise signal, the Manchester coded pseudonoise signal, and the multiplied sum signal.
Figure 14B:
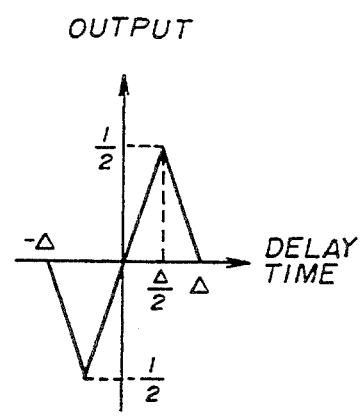
Figure 14C:
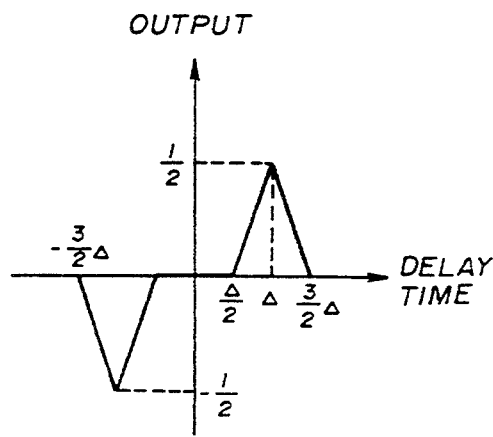
Figure 14D:
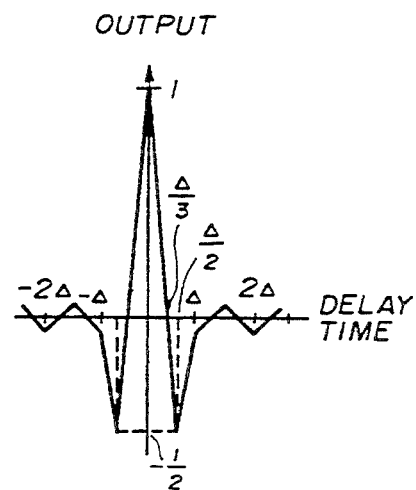

FIGS. 14A through 14D show the crosscorrelation and autocorrelation relating to the pseudonoise signal (PN), the Manchester coded pseudonoise signal (DPN), and the sum pseudonoise signal (WPN). In these figures, the relationship between the delay time and the correlated output relating to the pseudonoise signals is indicated. FIG. 14A shows the crosscorrelation of the PN and WPN signals. FIG. 14B shows the crosscorrelation of the PN and MPN signals. FIG. 14C shows the crosscorrelation of the MPN and WPN signals. FIG. 14D shows the autocorrelation of the MPN signal.

FIGS. 15A through 15D show several correlation characteristics of the multiplied signals which are derived from the correlations of the pseudonoise signals in FIGS. 14A through 14D.

A case in which only the PN signal is supplied to the receiver in FIG. 12 will be described. In this case, the signal at point I of the receiver indicates the crosscorrelation (FIG. 14A) of the PN and WPN signals multiplied by the first data signal. When synchronization is reached, the delay time is equal to zero, and the first data signal is reproduced at point I of the receiver. The signal at point Q of the receiver in this case indicates the crosscorrelation (FIG. 14B) of the PN and MPN signals multiplied by the first data signal. When synchronization is reached, the delay time is equal to zero, and the signal at point Q of the receiver is zero.

The two correlated signals output from the LPF 6a and 6b are supplied to the multiplier 4d of the receiver in FIG. 12. The multiplied signal from the multiplier 4d is supplied to the VCO 7 through the loop filter 8. The loop filter 8 supplies the direct current component of the multiplied signal to the VCO 7.

Figure 15A:
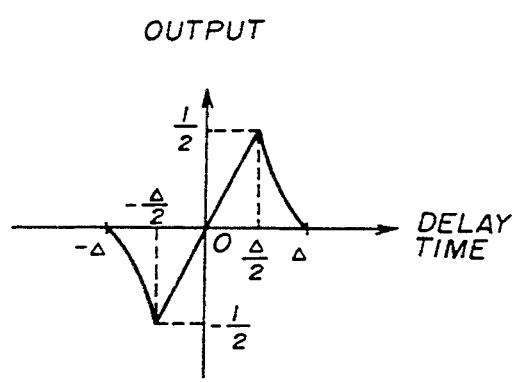
FIGS. 15A through 15D are charts showing several correlation characteristics of the multiplied signals which are derived from the correlations of the pseudonoise signals in FIGS. 14A through 14D.

FIG. 15A shows the correlation characteristic of a multiplied signal at the output of the loop filter 8 of the receiver in this case. The multiplied signal is produced by multiplying the crosscorrelation of the PN and WPN signals (FIG. 14A) by the crosscorrelation of the PN and MPN signals (FIG. 14B). It should be noted that in producing the multiplied signal the first data signal is included twice in the multiplication. Thus, the multiplied correlation characteristic in this case is not influenced by the first data signal.

Another case in which only the MPN signal is supplied to the receiver in FIG. 12 will be described. The signal at point I of the receiver in this case indicates the crosscorrelation (FIG. 14C) of the MPN and WPN signals multiplied by the second data signal. When synchronization is reached, the delay time is equal to zero, and the signal at point I of the receiver is zero. The signal at point Q of the receiver indicates the autocorrelation (FIG. 14D) of the MPN signal multiplied by the second data signal. When synchronization is reached, the delay time is equal to zero, and the second data signal is reproduced at point Q of the receiver. The direct current component of a multiplied signal (which indicates the product of the signal at point Q and the zero-value signal at point I) is supplied from the loop filter 8 to the VCO 7.

Figure 15B:
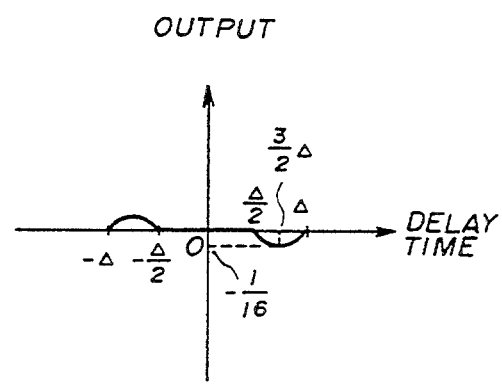

FIG. 15B shows the correlation characteristic of a multiplied signal at the output of the loop filter 8 of the receiver. The multiplied signal is produced by multiplying the autocorrelation (FIG. 14D) of the MPN signal by the crosscorrelation of the MPN and WPN signals (FIG. 14C). It should be noted that in producing the multiplied signal the second data signal is included twice in the multiplication, and that the multiplied correlation characteristic in this case is not influenced by the second data signal.

In actual cases, the PN signal and the MPN signal are modulated in accordance with the first data signal and the second data signal, respectively, and the multiplied signal including the modulated PN and MPN signals is supplied to the receiver. The signal at the output of the loop filter 8 in such cases indicates the specific correlation characteristic of a multiplied signal. The multiplied signal produced by multiplying the signal at point I of the receiver by the signal at point Q of the receiver is supplied to the VCO 7 as the sync signal to control the frequency at which a clock signal is generated by the VCO 7. When synchronization is reached, the delay time is equal to 0. The first information can be reproduced at point I of the receiver and the second information can be reproduced at point Q of the receiver at the time of the synchronization.

In the actual cases, the interference between the two pseudonoise signals multiplied by the first and second data signals becomes a significant problem. The multiplied signal including the modulated PN and MPN signals is supplied to the receiver, and it is difficult to correctly and efficiently reproduce the first and second data signals if the above mentioned interference is excessively great.

Figure 15C:
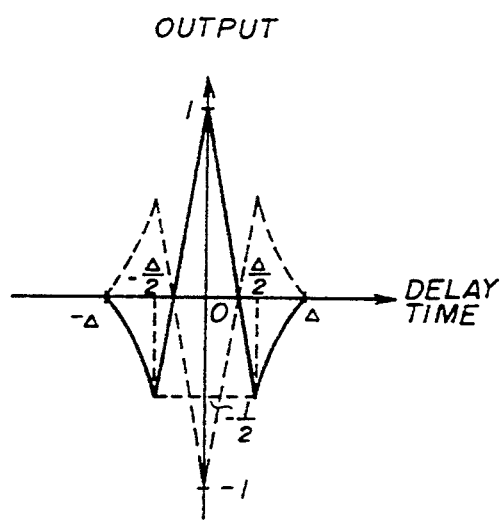

In one actual case, the signal at point I of the receiver indicates the crosscorrelation (FIG. 14A) of the PN and WPN signals multiplied by the first data signal, and the signal at point Q of the receiver indicates the autocorrelation (FIG. 14D) of the MPN signal multiplied by the second data signal. FIG. 15C shows the correlation characteristic of the multiplied signal at the output of the loop filter 8 of the receiver in this case. The polarity of the correlation characteristic in FIG. 15C may be inverted in accordance with the input information. The inverted correlation characteristic is indicated by a dotted line in FIG. 15C.

In the case of FIG. 15C, the interference between the two pseudonoise signals multiplied by the first and second data signals when synchronization is reached is relatively great. However, the polarity of the first and second signals changes at random between positive and negative states. The delay time when synchronization is reached is equal to 0, and the average of the values of the correlation characteristic can be regarded as being zero. Thus, the synchronization control is not significantly influenced by the interference mentioned above.

Figure 15D:
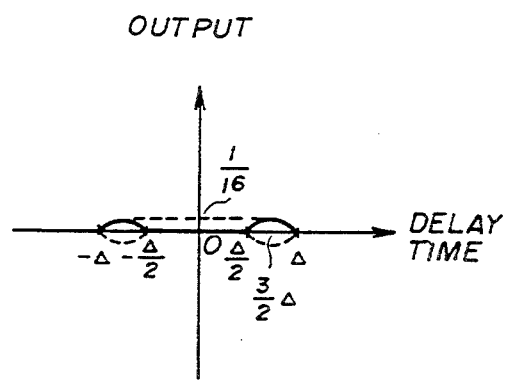

In the other actual case, the signal at point I of the receiver indicates the crosscorrelation (FIG. 14B) of the PN and MPN signals multiplied by the first data signal, and the signal at point Q of the receiver indicates the crosscorrelation (FIG. 14C) of the MPN and WPN signals multiplied by the second data signal. FIG. 15D shows the correlation characteristic of the multiplied signal at the output of the loop filter 8 of the receiver. The multiplied signal in FIG. 15D is produced by multiplying the crosscorrelation characteristic of FIG. 14B by the autocorrelation characteristic of FIG. 14C. The polarity of the correlation characteristic in FIG. 15D may be inverted in accordance with the input information. The inverted correlation characteristic is indicated by a dotted line in FIG. 15D.

In the case of FIG. 15D, the interference between the two pseudonoise signals multiplied by the first and second data signals when synchronization is reached is relatively great. However, the polarity of the first and second signals changes at random between positive and negative states. The delay time when synchronization is reached is equal to 0, and the average of the values of the correlation characteristic can be regarded as being zero. Thus, the synchronization control is not significantly influenced by the interference mentioned above.

Accordingly, in the case of the receiver in FIG. 12, the maximum amplitude of the sync signal is increased to an amplitude greater than the maximum amplitude of the sync signal used by the receiver in FIG. 3B (refer to FIGS. 15A–15D and FIGS. 6A–6E), and the sync signal delay discrimination characteristic is linear in a wide range of frequencies near the synchronization point. Thus, the synchronization function of the receiver of the fourth embodiment is made more stable.

Figure 16:
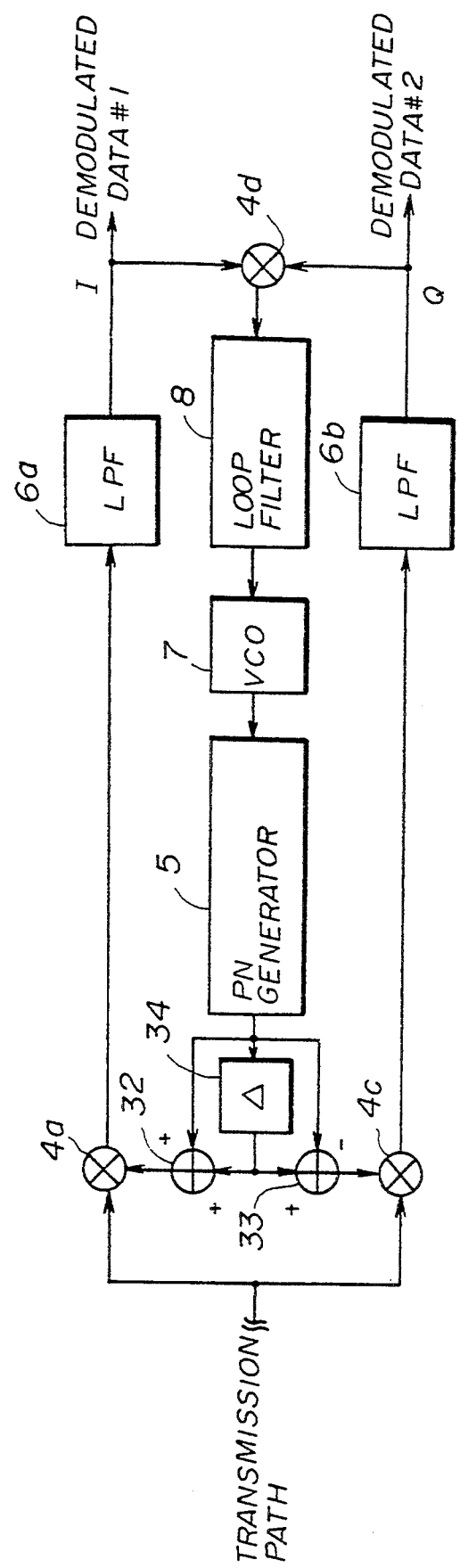
FIG. 16 is a block diagram showing a modification of the receiver of the fourth embodiment in FIG. 12.
Figure 17A:
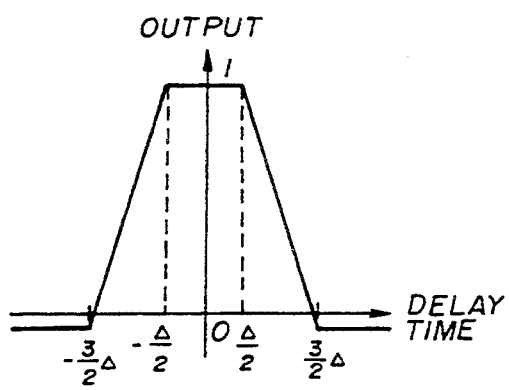
FIGS. 17A through 17D are charts showing the crosscorrelation and autocorrelation relating to the pseudonoise signal, the Manchester coded pseudonoise signal, and the multiplied sum signal.
Figure 17B:
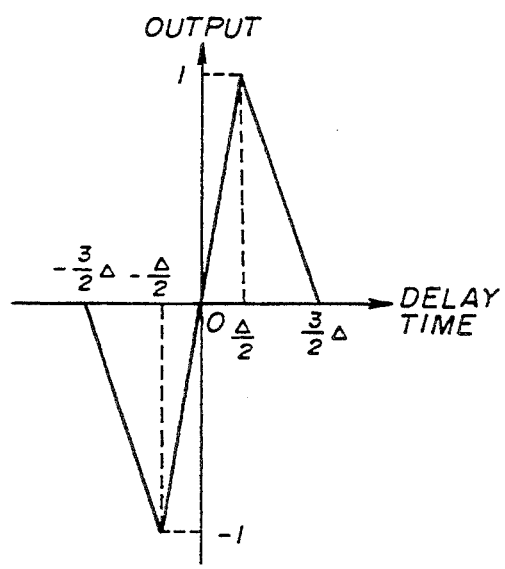
Figure 17C:
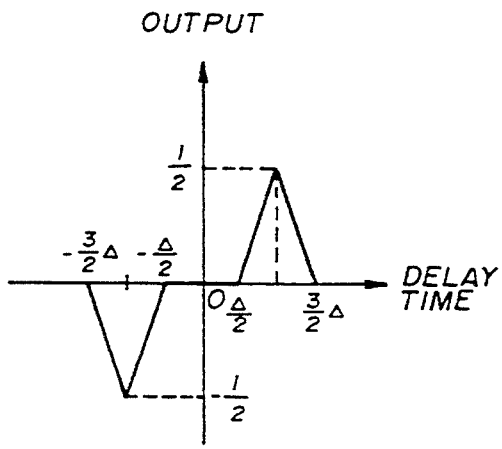
Figure 17D:
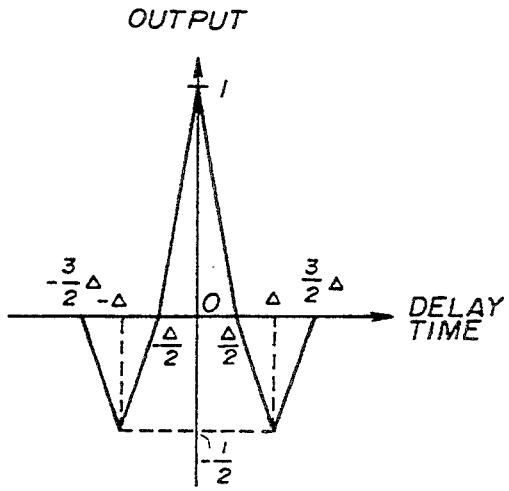
Figure 18A:
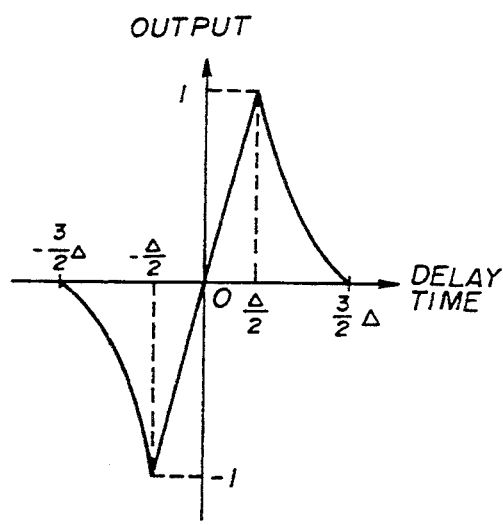
FIGS. 18A through 18D are charts showing several correlation characteristics of the multiplied signals which are derived from the correlations of the pseudonoise signals in FIGS. 17A through 17D.
Figure 18B:
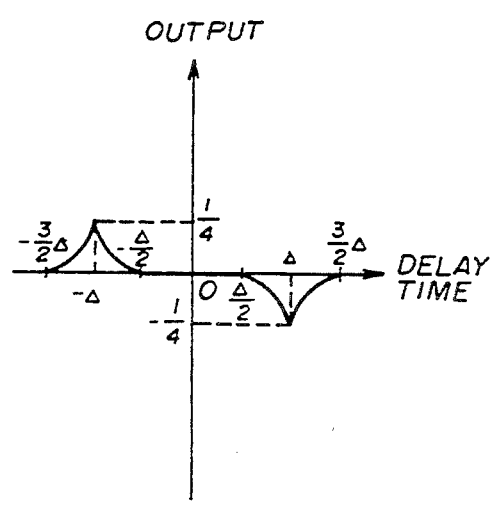
Figure 18C:
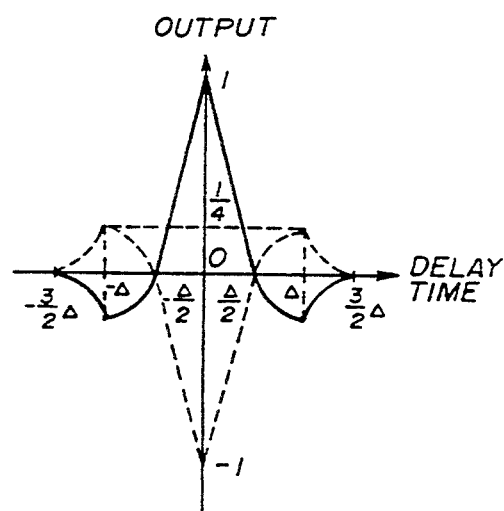
Figure 18D:
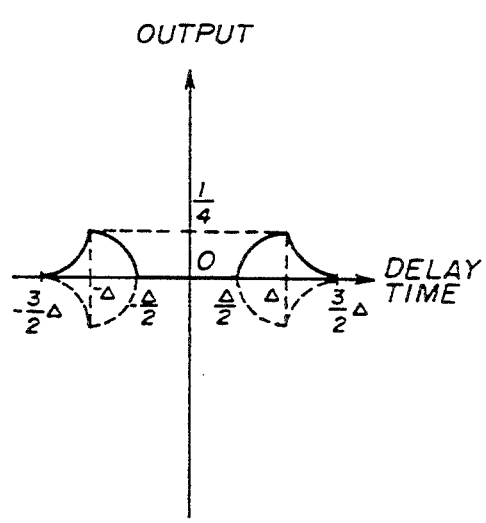

FIG. 16 shows a modified receiver in the spread spectrum communication system of the fourth embodiment in FIG. 12. The receiver in FIG. 16 includes a subtracter 33 and a one-chip delay circuit 34. The two ½-chip delay circuits 31a and 31b of FIG. 12 are replaced by the one-chip delay circuit 34 of FIG. 16. The other parts of the receiver in FIG. 16 are the same as the corresponding parts in FIG. 12, and they are designated by the same reference numerals.

The receiver in FIG. 16 uses the difference PN (DPN) signal instead of the MPN signal used by the receiver in FIG. 12. At the subtracter 33 of the receiver in FIG. 16, a one-chip delayed PN signal supplied from the one-chip delay circuit 33 is subtracted from the PN signal supplied from the PN generator 5. The subtracted signal output from the subtracter 33 is multiplied at the multiplier 4c by the received signal to produce the multiplied difference PN (DPN) signal. The DPN signal indicates the difference between the PN signal and the one-chip delayed PN signal, and it corresponds to the DPN signal shown in FIG. 13D.

In the receiver in FIG. 16, the WPN and DPN signals are produced from the PN signal generated by the PN generator 5 by means of the adder 32, the subtracter 33 and the one-chip delay circuit 34. The two pseudonoise signals are used to reproduce the two data signals by means of the synchronization loop.

FIGS. 17A through 17D show the crosscorrelation and autocorrelation relating to the PN signal, the MPN signal, the WPN signal and the DPN signal. FIGS. 18A through 18D show several correlation characteristics of the multiplied signals which are derived from the correlations of the pseudonoise signals in FIGS. 17A through 17D. As shown in FIGS. 18A–18D in comparison with FIGS. 15A–15D, the maximum amplitude of the sync signal in the case of the receiver in FIG. 16 is increased and it is twice as great as the maximum amplitude of the sync signal in the case of the receiver in FIG. 12. Thus, the synchronization function of the receiver in FIG. 16 is made more stable than that of the receiver in FIG. 12.

FIG. 19 shows a transmitter of the spread spectrum communication system of the fourth embodiment. The transmitter in FIG. 19 includes two ½-chip delay circuits 35a and 35b, and a subtracter 36. The other parts of the transmitter in FIG. 19 are the same as the corresponding parts in FIG. 3A, and they are designated by the same reference numerals.

The transmitter in FIG. 19 uses the difference pseudonoise (DPN) signal instead of the MPN signal used by the transmitter in FIG. 3A. At the subtracter 36, a PN signal output from the PN generator 1 is subtracted from the one-chip delayed PN signal output from the delay circuit 35b to produce a DPN signal shown in FIG. 13D. At the multiplier 2c, the DPN signal output from the subtracter 36 is multiplied by the second data signal, and a multiplied signal output from the multiplier 2c is input to the adder 3. At the multiplier 2a, the half-chip delayed PN signal output from the ½-chip delay circuit 35a is multiplied by the first data signal. A multiplied signal output from the multiplier 2a is input to the adder 3. The signal to be transmitted is produced at the output of the adder 3 by adding the multiplied signal from the multiplier 2a to the multiplied signal from the multiplier 2c.

FIG. 20 shows a modified transmitter in the spread spectrum communication system of the fourth embodiment. The transmitter in FIG. 20 includes the two ½-chip delay circuits 35a and 35b, an AND circuit 37, an XNOR circuit 38, and a tri-state buffer 39. The other parts of the transmitter in FIG. 20 are the same as the corresponding parts in FIG. 19, and they are designated by the same reference numerals.

In the transmitter in FIG. 20, the subtracter 36 of FIG. 19 is replaced by the AND circuit 37, the XNOR circuit 38 and the tri-state buffer 39. If the subtracter 36 of FIG. 19 outputs one of three distinct values 0, −2 and +2, the transmitter of FIG. 20 outputs one of three values 0, −1 and +1 by means of the AND circuit 37, the XNOR circuit 38 and the tri-state buffer 39. In the transmitter in FIG. 20, the amplitude of the DPN signal is reduced to half the amplitude of the DPN signal output from the subtracter 36 of FIG. 19 such that the amplitude of the DPN signal is equal to the amplitude of the PN signal generated by the PN generator 1. The error rate of the transmitted signal produced from the two pseudonoise signals can be reduced with the transmitter in FIG. 20.

FIG. 21 shows another modified receiver in the spread spectrum communication system of the fourth embodiment. A transmitter that is similar to the transmitter in FIG. 7B is usable with the receiver in FIG. 21. With the transmitter and the receiver of the spread spectrum communication system of this embodiment, radio communication is carried out by making use of the two pseudonoise signals.

In the transmitter of the fourth embodiment, the signal to be transmitted is produced by multiplying the signal from the adder by a local-frequency (LF) carrier signal from the local oscillator. The transmitted signal from the transmitter is received by the receiver in FIG. 21. In the receiver, the transmitted signal received at the antenna is multiplied by a locally generated carrier signal from the local oscillator 12, whose frequency is equal to an intermediate frequency added to the transmitter local frequency (LF±IF), and this reception signal is input to each of the multipliers 4a and 4b. The reception signal is multiplied by the two pseudonoise signals (the WPN and MPN signals or the DPN and WPN signals) to produce first and second multiplied signals. The first and second multiplied signals are respectively passed through the band-pass filters (BPF) to produce first and second correlated signals. The first correlated signal is multiplied by the second correlated signal at the multiplier 4d, and the loop filter 8 supplies the direct current component of this multiplied signal to the VCO 7 to produce a sync signal. The PN generator 5 generates the PN signal in accordance with the sync signal supplied from the VCO 7, so that the synchronization loop is formed.

One of the two correlated signals output from the BPF is input to the IF carrier reproducing unit 15. In the IF carrier reproducing unit 15, the correlated signal is multiplied by itself, and the multiplied signal is passed through the BPF to output an intermediate-frequency signal (2·IF). The ½ frequency divider 14 supplies the divided intermediate frequency (IF) signal to reproduce an intermediate-frequency carrier signal (IF). The carrier signal output from the IF carrier reproducing unit 15 is output to each of the multipliers 4e and 4f. The correlated signals are multiplied by the carrier signal output from the IF carrier reproducing unit 15, and the multiplied signals are passed through the LPF 6a and 6b to reproduce the first and second data signals.

Figure 22A:
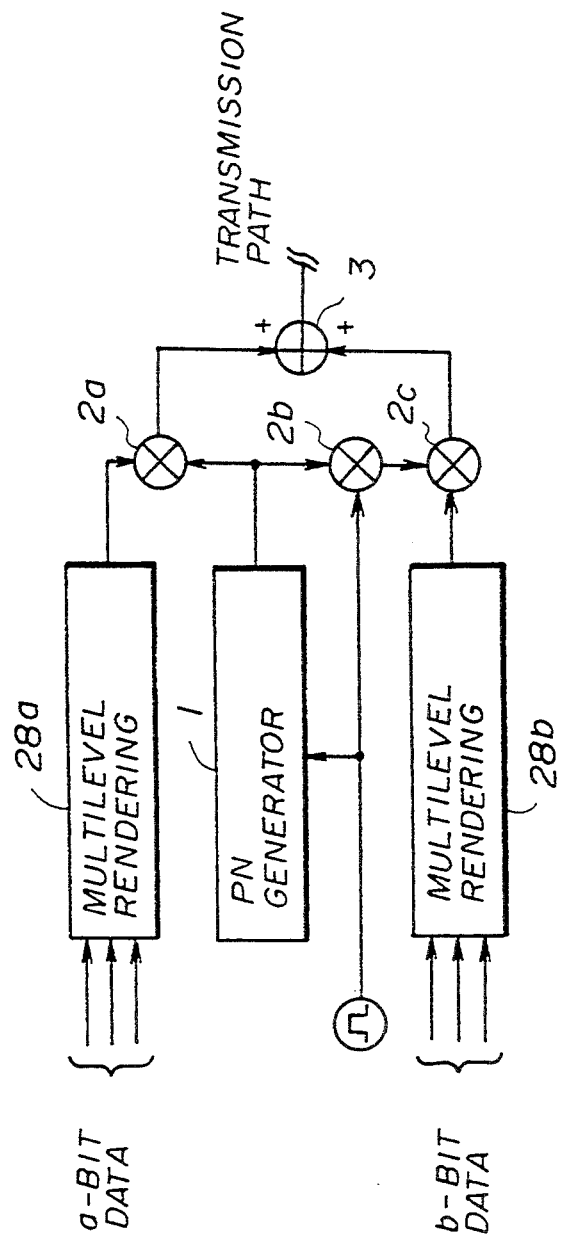
FIGS. 22A and 22B are block diagrams showing a transmitter and a receiver of a fifth embodiment of the present invention.
Figure 22B:
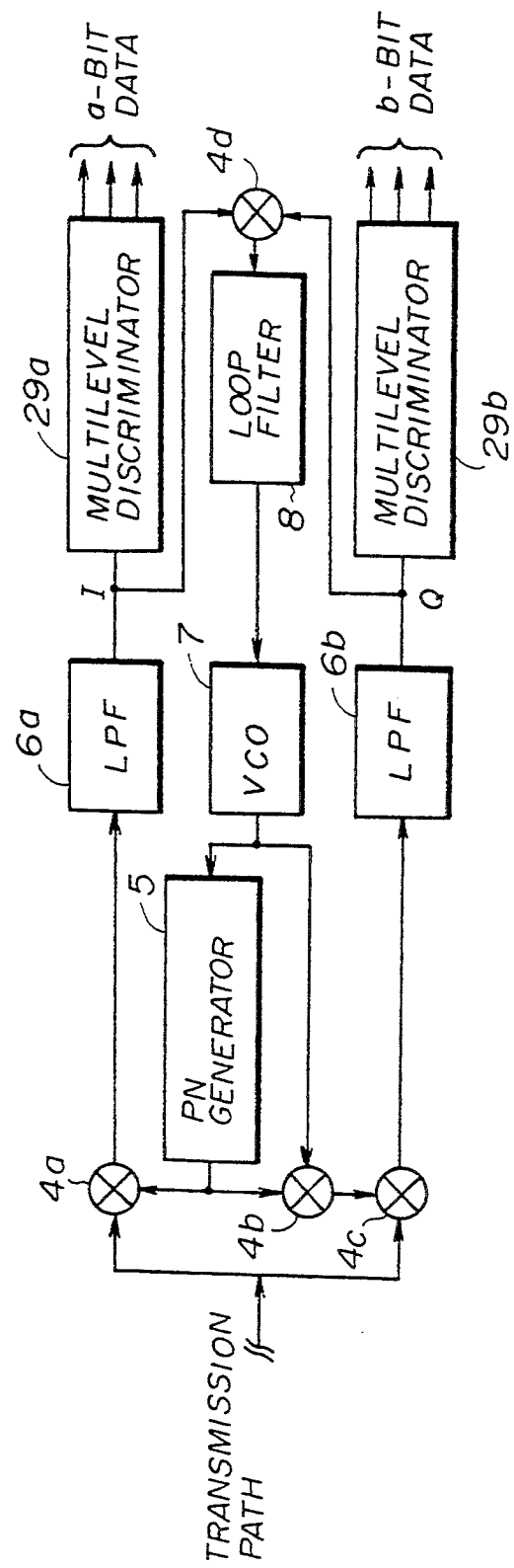

Next, a description will be given, with reference to FIGS. 22A and 22B, of a fifth embodiment of the present invention. FIG. 22A shows a transmitter of the spread spectrum communication system of the fifth embodiment, and FIG. 22B shows a receiver of this embodiment. The transmitter in FIG. 22A includes two multilevel rendering units 28a and 28b. The receiver in FIG. 22B includes two multilevel discriminators 29a and 29b. The other parts of the transmitter and the receiver in FIGS. 22A and 22B are the same as the corresponding parts in FIGS. 3A and 3B, and they are designated by the same reference numerals. With the spread spectrum communication system in FIGS. 22A and 22B, the transmission and reception of baseband n-bit data signals can be carried out.

In the transmitter in FIG. 22A, the two pseudonoise signals are respectively modulated by the multilevel data signals output from the multilevel rendering units 28a and 28b, and the two modulated signals are added to each other to produce the signal to be transmitted.

More specifically, in the transmitter in FIG. 22A, a clock signal is input to the PN generator 1, so that the PN generator 1 generates a PN signal in accordance with the clock signal as shown in FIG. 4A. The PN signal output from the PN generator 1 is multiplied at the multiplier 2b by the clock signal, so that an MPN signal as shown in FIG. 4B is generated at the output of the multiplier 2b.

An n-bit data signal indicating input information is divided into an a-bit data signal and a b-bit data signal (n=a+b). The a-bit data signal indicating first information is input to the multilevel rendering unit 28a, and the multilevel rendering unit 28a outputs a first multilevel signal to the multiplier 2a. The b-bit data signal indicating second information is input to the multilevel rendering unit 28b, and the multilevel rendering unit 28b outputs a second multilevel signal to the multiplier 2c.

The PN signal from the PN generator 1 is multiplied by the first multilevel signal at the multiplier 2a, and a multiplied signal output from the multiplier 2a is input to the adder 3. The MPN signal from the multiplier 2b is multiplied by the second multilevel signal at the multiplier 2c, and a multiplied signal output from the multiplier 2c is input to the adder 3. Thus, the transmitted signal is produced at the output of the adder 3 by adding the multiplied signal from the multiplier 2a to the multiplied signal from the multiplier 2c, and this signal is transmitted by the transmitter via a transmission path.

The multilevel rendering units of the transmitter in FIG. 22A use either a known digital-to-analog converter or a combination of a known damping unit and a known diode switch. A known multilevel rendering method is used to generate a multilevel signal from a k-bit data signal, the multilevel signal indicating one of a plurality of distinct values 0 through $(2^k - 1)$.

The receiver shown in FIG. 22B receives the transmitted signal from the transmitter via a transmission path, and it reproduces the first and second information from the received signal. In the receiver in FIG. 22B, a clock signal output from the VCO 7 is input to the PN generator 5, so that a PN signal is generated by the PN generator 5 in accordance with the clock signal. The sequence of the PN signal output from the PN generator 5 is the same as that output from the PN generator 1 in the transmitter in FIG. 22A. The PN signal output from the PN generator 5 is multiplied at the multiplier 4b by the clock signal output from the VCO 7, so that an MPN signal is generated at the output of the multiplier 4b. The sequence of the MPN signal output from the multiplier 4b is the same as that output from the multiplier 2b in the transmitter in FIG. 22A.

The transmitted signal from the transmitter is supplied to each of the multipliers 4a and 4c. The PN signal from the PN generator 5 is multiplied by the transmitted signal at the multiplier 4a, and a multiplied signal output from the multiplier 4a is passed through the LPF 6a to produce a correlated signal of the PN signal at point "I" of the receiver. This correlated signal is input to the multilevel discriminator 29a, and the multilevel discriminator 29a outputs an a-bit data signal indicating the first information.

On the other hand, the MPN signal output from the multiplier 4b is multiplied by the transmitted signal at the multiplier 4c, and a multiplied signal output from the multiplier 4c is passed through the LPF 6b to produce a correlated signal of the MPN signal at point "Q" of the receiver. This correlated signal is input to the multilevel discriminator 29b, and the multilevel discriminator 29b outputs a b-bit signal indicating the second information.

The multilevel discriminators 29a and 29b in FIG. 22B use either a known analog-to-digital converter or a set of known comparators with different reference voltages.

Figure 23A:
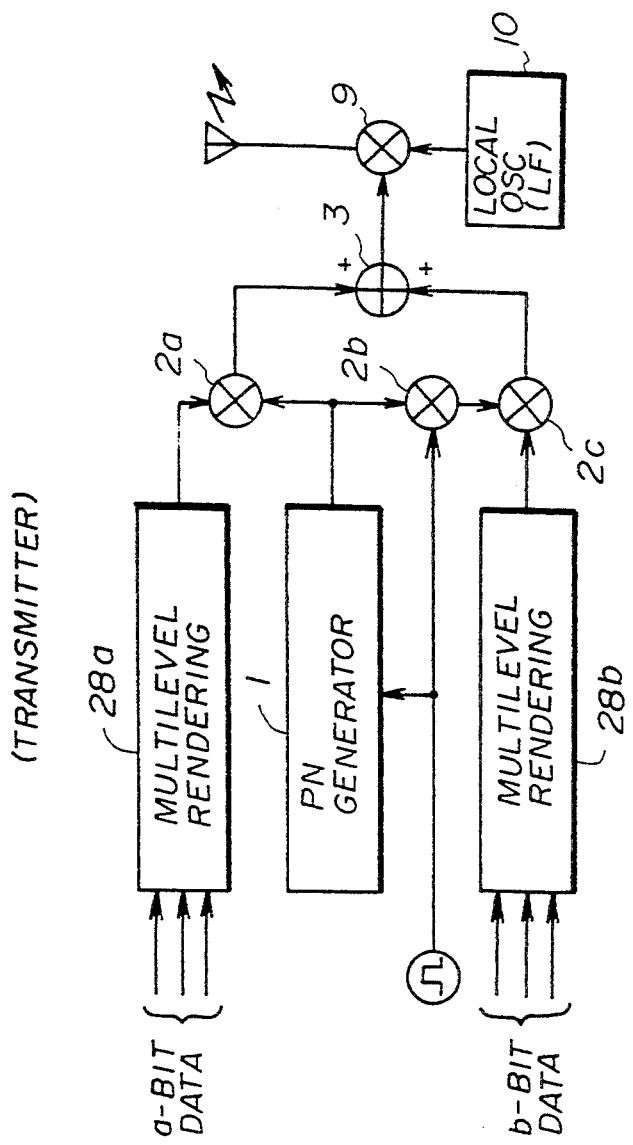

FIGS. 23A and 23B show a transmitter and a receiver of a sixth embodiment of the present invention. The spread spectrum communication system of this embodiment carries out radio communication by making use of the two pseudonoise signals. In FIGS. 23A and 23B, the parts which are the same as corresponding parts in FIGS. 7A and 7B are designated by the same reference numerals. Similarly to the fifth embodiment in FIGS. 22A and 22B, the transmitter includes the two multilevel rendering units 28a and 28b, and the receiver includes the two multilevel discriminators 29a and 29b.

In the transmitter in FIG. 23A, the input of the multiplier 9 is connected to the adder 3, and the output of the multiplier 9 is connected to the antenna, and the local oscillator 10 is connected to the multiplier 9. A local-frequency carrier signal (LF) generated by the local oscillator 10 is input to the multiplier 9. The multiplier 9 multiplies the transmitted signal output from the adder 3 by the carrier signal output from the local oscillator 10, and the multiplied signal output from the multiplier 9 has an appropriate frequency for radio communication.

The receiver in FIG. 23B includes the multiplier 11 connected to the antenna, the local oscillator 12 connected to the multiplier 11, the three band-pass filters (BPF) 13a through 13c, the $\frac{1}{2}$ frequency divider 14, the three multipliers 4e through 4g, and the IF carrier reproducing unit 15. In order to produce intermediate-frequency correlated signals, the local oscillator 12 supplies a carrier signal of a locally generated frequency to the multiplier 11, which frequency is equal to an intermediate frequency added to the transmitter local frequency. The multiplier 11 multiplies the transmitted signal received at the antenna by the carrier signal from the local oscillator 12 to produce an intermediate-frequency reception signal.

In the receiver in FIG. 23B, the reception signal output from the multiplier 11 is supplied to each of the multipliers 4a and 4b. The reception signal is multiplied at the multiplier 4a by the PN signal from the PN generator 5, and a multiplied signal is passed through the BPF 13a to produce a first correlated signal of intermediate frequency at the output of the BPF 13a. On the other hand, the reception signal output from the multiplier 11 is multiplied at the multiplier 4c by the MPN signal from the multiplier 4b, and a multiplied signal is passed through the BPF 13b to produce a second correlated signal of intermediate frequency at the output of the BPF 13b. The two correlated signals include the data signal component and the IF carrier signal component.

The carrier signal component of the correlated signals is supplied to the loop filter 8 twice, and the signal at the output of the loop filter 8 is comprised of the direct current component. As the signal at the output of the loop filter 8 has the correlation characteristics similar to those shown in FIGS. 6A through 6E, a sync signal is supplied from the loop filter 8 to the VCO 7 in a manner similar to the manner of the receiver in FIG. 3B.

The first correlated signal from the BPF 13a is multiplied at the multiplier 4e by the signal output from the IF carrier reproducing unit 15, and a multiplied signal output from the multiplier 4e is passed through the LPF 6a to produce a multilevel signal at the output of the LPF 6a. This multilevel signal is input to the multilevel discriminator 29a, and the multilevel discriminator 29a outputs an a-bit data signal indicating the first information.

On the other hand, the second correlated signal from the BPF 13b is multiplied at the multiplier 4f by the signal output from the IF carrier reproducing unit 15, and a multiplied signal output from the multiplier 4f is passed through the LPF 6b to produce a multilevel signal at the output of the LPF 6b. This multilevel signal is input to the multilevel discriminator 29b, and the multilevel discriminator 29b outputs a b-bit signal indicating the second information.

FIGS. 24A and 24B show a transmitter and a receiver of a seventh embodiment of the present invention. The transmitter in FIG. 24A includes the 1/N frequency divider 16, the local oscillator 17 and the two multilevel rendering units 28a and 28b. The divider 16 is connected to the PN generator 1 and to the multiplier 2b. The local oscillator 17 generates a clock signal of oscillation frequency N·Fc, and this clock signal is supplied to the divider 16 and to the multiplier 9. The divider 16 supplies the clock signal of divided frequency Fc to the PN generator 1 and to the multiplier 2b. The PN generator 1 generates the PN signal in accordance with the clock signal of divided frequency Fc. The a-bit data signal indicating first information is input to the multilevel rendering unit 28a, and the multilevel rendering unit 28a outputs a first multilevel signal to the multiplier 2a. The b-bit data signal indicating second information is input to the multilevel rendering unit 28b, and the multilevel rendering unit 28b outputs a second multilevel signal to the multiplier 2c.

The receiver in FIG. 24B includes the two band-pass filters (BPF) 18a and 18b, the 1/M frequency divider 19, the L frequency multiplier 20, and the two multipliers 4e and 4f. In FIG. 24B, the voltage-controlled oscillator (VCO) 7 generates a clock signal of oscillation frequency M·Fc, and this clock signal is supplied to the multiplier 11 and to the divider 19. The divider 19 outputs the clock signal of divided frequency Fc to the PN generator 5. The PN generator 5 generates the PN signal in accordance with the clock signal of divided frequency Fc. The clock signal from the divider 19 is supplied to the multiplier 4b and to the frequency multiplier 20. The frequency multiplier 20 outputs the clock signal of multiplied frequency L·Fc to each of the multipliers 4e and 4f, where L=|M−N|. The clock signal of intermediate frequency L·Fc output from the frequency multiplier 20 is multiplied at the multiplier 4e by the first correlated signal from the BPF 18a. The clock signal of intermediate frequency L·Fc output from the frequency multiplier 20 is multiplied at the multiplier 4f by the second correlated signal from the BPF 18b.

Figure 25:
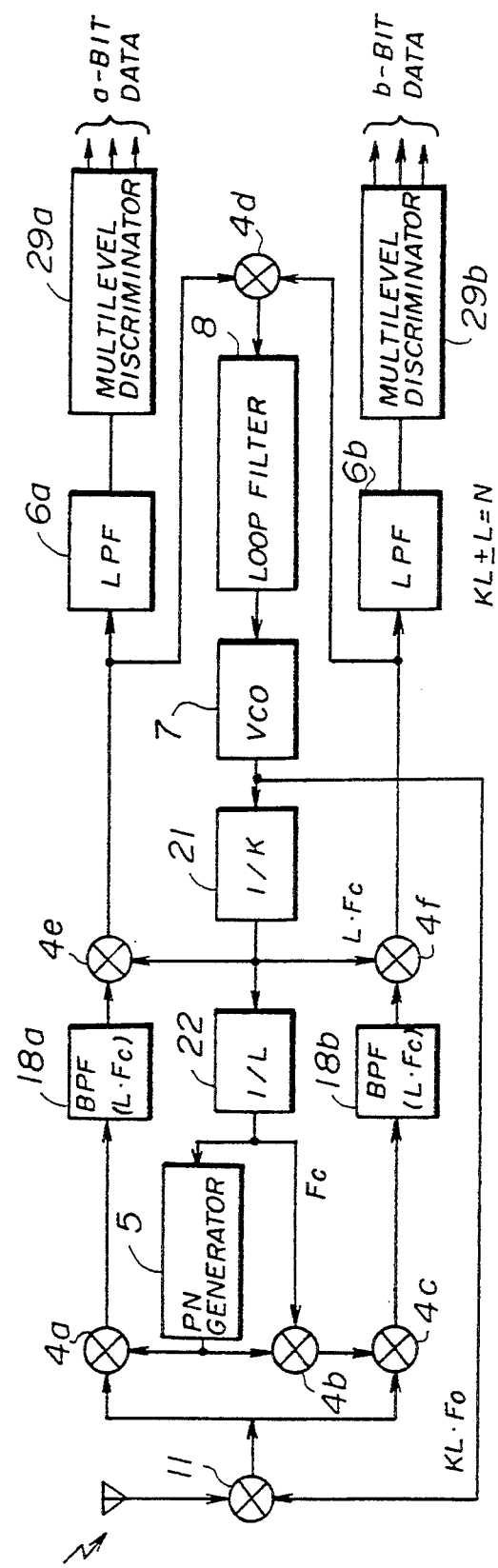
FIGS. 25 and 26 are block diagrams showing modifications of the receiver of the seventh embodiment in FIG. 24B.

FIG. 25 shows a modified receiver in the spread spectrum communication system of the seventh embodiment. The receiver in FIG. 25 includes the 1/K frequency divider 21, the 1/L frequency divider 22 and the two multilevel discriminators 29a and 29b. In FIG. 25, the parts which are the same as corresponding parts in FIG. 9 are designated by the same reference numerals.

The receiver in FIG. 25 uses the frequency divider instead of the frequency multiplier 20 shown in FIG. 24. A clock signal of oscillation frequency KLFc generated by the VCO 7 is supplied to the multiplier 11 and to the 1/K frequency divider 21. The frequency divider 21 outputs the clock signal of divided frequency LFc to the frequency divider 22 and to the multipliers 4e and 4f. The signal output from the divider 21 is multiplied at the multipliers 4e and 4f by the first and second correlated signals from the BPF 18a and 18b, respectively. The frequency divider 22 supplies the clock signal of divided frequency Fc to the PN generator 5 and to the multiplier 4b. The PN generator 5 generates the PN signal in accordance with the clock signal of divided frequency Fc output from the divider 22, where N is equal to either (KL+L) or (KL−L).

The multiplied signal output from the multiplier 4e is passed through the LPF 6a to produce a multilevel signal at the output of the LPF 6a. This multilevel signal is input to the multilevel discriminator 29a, and the multilevel discriminator 29a outputs an a-bit data signal indicating the first information. On the other hand, the multiplied signal output from the multiplier 4f is passed through the LPF 6b to produce a multilevel signal at the output of the LPF 6b. This multilevel signal is input to the multilevel discriminator 29b, and the multilevel discriminator 29b outputs a b-bit signal indicating the second information.

Figure 26:
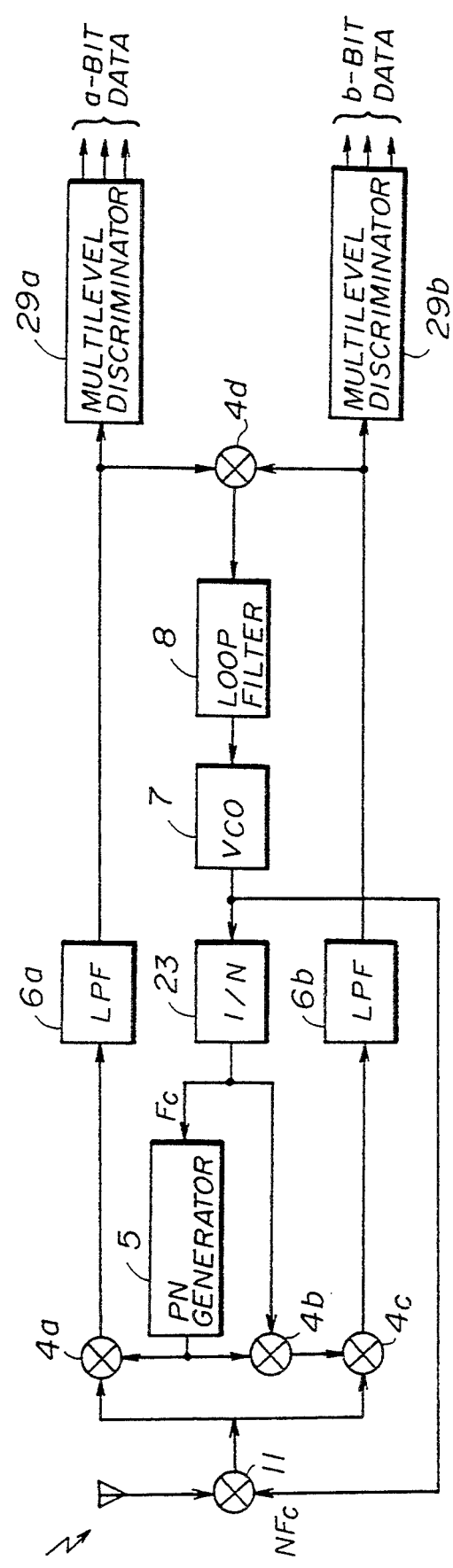

FIG. 26 shows another modified receiver in the spread spectrum communication system of the seventh embodiment. The receiver in FIG. 26 includes the 1/N frequency divider 23 and the two multilevel discriminators 29a and 29b. In FIG. 26, the parts which are the same as corresponding parts in FIG. 25 are designated by the same reference numerals.

The receiver in FIG. 26 uses a carrier signal whose frequency is equal to zero. A clock signal of oscillation frequency NFc generated by the VCO 7 is supplied to the multiplier 11 and to the 1/N frequency divider 23. The frequency divider 23 outputs the clock signal of divided frequency Fc to the PN generator 5 and to the multiplier 4b. The PN generator 5 generates the PN signal in accordance with the clock signal of divided frequency Fc output from the divider 23. The receiver in FIG. 26 is similar to the receiver in FIG. 3B, and the structure of this receiver is simple because it uses no intermediate frequency signal. In the radio frequency part of the receiver in FIG. 26, the transmitted signal from the transmitter is converted to the multiplied signals in the baseband frequency range. The correlated signals are respectively passed through the LPF 6a and the LPF 6b to reproduce the first data signal and the second data signal by means of the multilevel discriminators 29a and 29b.

Further, the present invention is not limited to the above described embodiments, and variations and modifications may be made without departing from the scope of the present invention.

What is claimed is:

1. A spread spectrum communication system which comprises:
   a transmitter comprising:
   a pseudonoise signal generator for generating a pseudonoise signal in accordance with a clock signal;
   pseudonoise signal means for generating a Manchester coded pseudonoise signal by encoding the pseudonoise signal output from said pseudonoise signal generator in accordance with the clock signal;
   first modulation means for generating a first spread spectrum signal by multiplying said pseudonoise signal output from said pseudonoise signal generator by a first data signal indicating first information;
   second modulation means for generating a second spread spectrum signal by multiplying said Manchester coded pseudonoise signal output from said pseudonoise signal means by a second data signal indicating second information; and
   synthesizing means for generating a signal to be transmitted, by adding the first spread spectrum signal output from said first modulation means to the second spread spectrum signal output from said second modulation means, and
   a receiver responsive to the signal transmitted by said transmitter.

2. A spread spectrum communication system according to claim 1, wherein said receiver comprises:
   a voltage-controlled oscillator for generating a clock signal at a frequency according to a sync signal;
   a second pseudonoise signal generator for generating a second pseudonoise signal in accordance with the clock signal output from said voltage-controlled oscillator, in which the sequence of said second pseudonoise signal accords with the sequence of the pseudonoise signal generated by the pseudonoise signal generator of the transmitter;

second signal generating means for generating a second Manchester coded pseudonoise signal encoding the pseudonoise signal output from said second pseudonoise signal generation in accordance with the clock signal output from said voltage-controlled oscillator;

first means for multiplying the second pseudonoise signal from said second pseudonoise signal generator by the transmitted signal from the transmitter to produce a first multiplied signal, and for passing said first multiplied signal through a first low-pass filter to produce a first correlated signal indicating the first information at the output of the first low-pass filter;

second means for multiplying the second Manchester coded pseudonoise signal from said second signal generating means by the transmitted signal received from the transmitter to produce a second multiplied signal, and for passing said second multiplied signal through a second low-pass filter to produce a second correlated signal indicating the second information at the output of the second low-pass filter; and sync signal means for multiplying the first correlated signal from signal from said first means by the second correlated signal from said second means to produce a multiplied signal, and for passing said multiplied signal through a loop filter to produce a sync signal at the output of the loop filter, and for supplying said sync signal to said voltage-controlled oscillator, so that said second pseudonoise signal generator generates the PN signal in accordance with the clock signal output from said voltage-controlled oscillator.

3. A spread spectrum communication system according to claim 2, wherein said receiver further comprises:
a first multilevel discriminator for reproducing the first data signal from the first correlated signal at the output of the first low-pass filter; and
a second multilevel discriminator for reproducing the second data signal from the second correlated signal at the output of the second low-pass filter.

4. A spread spectrum communication system according to claim 2, wherein said receiver further comprises:
a second oscillator for generating a second carrier signal of an intermediate frequency added to a local frequency; and
frequency converting means for multiplying the transmitted signal from the transmitter by the second carrier signal output from said second oscillator to produce a reception signal of intermediate frequency, and for supplying said reception signal to said first means and to said second means.

5. A spread spectrum communication system according to claim 4, wherein said receiver further comprises frequency dividing means for generating a clock signal of a divided frequency by dividing the frequency of the clock signal output from said voltage-controlled oscillator, and for supplying said clock signal of the divided frequency to the second pseudonoise signal generator.

6. A spread spectrum communication system according to claim 5, wherein said receiver further comprises means for multiplying the transmitted signal from the transmitter by the clock signal output from said voltage-controlled oscillator to produce a reception signal, and for supplying the reception signal to said first means and to said second means.

7. A spread spectrum communication system according to claim 4, wherein said receiver further comprises means for multiplying the transmitted signal from the transmitter by the clock signal output from said voltage-controlled oscillator to produce a reception signal, and for supplying the reception signal to said first means and to said second means.

8. A spread spectrum communication system according to claim 4, wherein said receiver further comprises:
means for multiplying the transmitted signal from the transmitter by the clock signal output from said voltage-controlled oscillator to produce a reception signal, and for supplying the reception signal to said first means and to said second means; and
dividing means for generating a clock signal of a divided frequency by dividing a frequency of the clock signal output from said voltage-controlled oscillator, and for supplying said clock signal of the divided frequency to the second pseudonoise signal generator and to said second signal generating means.

9. A spread spectrum communication system according to claim 4, wherein said receiver further comprises:
a first multilevel discriminator for reproducing the first data signal from the first correlated signal at the output of the first low-pass filter; and
a second multilevel discriminator for reproducing the second data signal from the second correlated signal at the output of the second low-pass filter.

10. A spread spectrum communication system according to claim 1, wherein said transmitter further comprises:
a first oscillator for generating a carrier signal of a local frequency; and
output means for multiplying the transmitted signal output from said synthesizing means by the carrier signal output from said first oscillator, and for transmitting said multiplied signal via an antenna.

11. A spread spectrum communication system according to claim 10, wherein said transmitter further comprises a frequency divider for generating a clock signal of divided frequency by dividing the frequency of the carrier signal output from said first oscillator, so that the clock signal output from said frequency divider is supplied to said pseudonoise signal generator.

12. A spread spectrum communication system according to claim 10, wherein said transmitter further comprises:
a first multilevel rendering unit for generating a first multilevel signal having a plurality of bits from the first data signal, and for supplying the first multilevel signal to said first modulation means; and
a second multilevel rendering unit for generating a second multilevel signal having a plurality of bits from the second data signal, and for supplying the second multilevel signal to said second modulation means.

13. A spread spectrum communication system according to claim 1, wherein said receiver comprises:
a second oscillator for generating a second carrier signal of an intermediate frequency added to a local frequency;
frequency converting means for multiplying the transmitted signal from the transmitter by the second carrier signal output from said second oscillator to produce a reception signal of intermediate frequency;

a voltage-controlled oscillator for generating a clock signal at a frequency according to a sync signal;

a second pseudonoise signal generator for generating a second pseudonoise signal in accordance with the clock signal output from said voltage-controlled oscillator;

second signal generating means for generating a second Manchester coded pseudonoise signal by encoding the second pseudonoise signal output from said second pseudonoise signal generator in accordance with the clock signal output from said voltage-controlling oscillator;

first means for multiplying the second pseudonoise signal from said second pseudonoise signal generator by the reception signal output from said frequency converting means to produce a first multiplied signal, and for passing said first multiplied signal through a first band-pass filter to produce a first correlated signal at the output of the first band-pass filter;

second means for multiplying the second Manchester coded pseudonoise signal from said second signal generating means by the reception signal output from said frequency converting means to produce a second multiplied signal, and for passing said second multiplied signal through a second band-pass filter to produce a second correlated signal at the output of the second band-pass filter;

sync signal means for multiplying the first correlated signal from said first means by the second correlated signal from said second means to produce a multiplied signal, and for passing said multiplied signal through a loop filter to produce a sync signal at the output of the loop filter, and for supplying said sync signal to said voltage-controlled oscillator, so that said voltage-controlled oscillator supplies the clock signal to said second pseudonoise signal generator at a frequency according to said sync signal;

carrier reproducing means for multiplying either the first correlated signal or the second correlated signal by itself, and for passing the multiplied correlated signal through a third band-pass filter, and for generating a carrier signal of the intermediate frequency by dividing the frequency of a signal output from said third band-pass filter;

third means for multiplying the first correlated signal output from said first means by the carrier signal output from said carrier reproducing means to produce a third multiplied signal, and for passing the third multiplied signal through a first low-pass filter to reproduce the first data signal at the output of the first low-pass filter; and fourth means for multiplying the second correlated signal output from said second means by the carrier signal output from said carrier reproducing means to produce a fourth multiplied signal, and for passing the fourth multiplied signal through a second low-pass filter to reproduce the second data signal at the output of the second low-pass filter.

14. A spread spectrum communication system according to claim 13, wherein said receiver further comprises:

a first multilevel discriminator for reproducing the first data signal from the first correlated signal at the output of the first low-pass filter; and a second multilevel discriminator for reproducing the second data signal from the second correlated signal at the output of the second low-pass filter.

15. A spread spectrum communication system according to claim 1, wherein each of said pseudonoise signal means, said first modulation means and said second modulation means is a multiplier, and said synthesizing means is an adder.

16. A spread spectrum communication system according to claim 1, wherein each of said pseudonoise signal means, said first modulation means and said second modulation means is an exclusive-OR circuit, and said synthesizing means is made of an AND circuit, an exclusive-OR circuit and a tri-state buffer.

17. A spread spectrum communication system according to claim 1, wherein said transmitter further comprises:

a first multilevel rendering unit for generating a first multilevel signal having a plurality of bits from the first data signal, and for supplying the first multilevel signal to said first modulation means; and a second multilevel rendering unit for generating a second multilevel signal having a plurality of bits from the second data signal, and for supplying the second multilevel signal to said second modulation means.

18. A spread spectrum communication system according to claim 1, wherein at least one of the first and second data signals indicating the first and second information is subjected to Manchester coding to produce a Manchester coded data signal, and said data signals are supplied to said transmitter.

19. A spread spectrum communication system which comprises:

a transmitter comprising:

a pseudonoise signal generator for generating a pseudonoise signal in accordance with a clock signal;

first delay means for generating a half-chip delayed pseudonoise signal by delaying the pseudonoise signal output from said pseudonoise signal generator by a half-chip cycle;

second delay means for generating a one-chip delayed pseudonoise signal by delaying the half-chip delayed pseudonoise signal output from said first delay means by a half-chip cycle;

first pseudonoise signal means for generating a sum pseudonoise signal as the sum of the pseudonoise signal output from said pseudonoise signal generator and the one-chip delayed pseudonoise signal output from said second delay means;

first modulation means for generating a first spread spectrum signal by multiplying the half-chip delayed pseudonoise signal output from said first delay means by a first data signal indicating first information;

second modulation means for generating a second spread spectrum signal by multiplying the sum pseudonoise signal output from said pseudonoise signal means by a second data signal indicating second information; and synthesizing means for generating a signal to be transmitted, by adding the first spread spectrum signal output from said first modulation means to the second spread spectrum signal output from said second modulation means, and a receiver responsive to the signal transmitted by said transmitter.

20. A spread spectrum communication system according to claim 19, wherein said receiver comprises:
a voltage-controlled oscillator for generating a clock signal at a frequency according to a sync signal;
a second pseudonoise signal generator for generating a second pseudonoise signal in accordance with the clock signal output from said voltage-controlled oscillator, in which the sequences for said second pseudonoise signal accords with the sequence of the pseudonoise signal generated by the pseudonoise signal generator of the transmitter;
third delay means for generating a second half-chip delayed pseudonoise signal by delaying the second pseudonoise signal output from said second pseudonoise signal generator by a half-chip cycle;
fourth delay means for generating a second one-chip delayed pseudonoise signal with respect to the second pseudonoise signal from said second pseudonoise signal generator by delaying the second half-chip delayed pseudonoise signal from said third delay means by a half-chip cycle;
second signal generating means for generating a second sum pseudonoise signal as the sum of the second pseudonoise signal output from said second pseudonoise signal generator and the second one-chip delayed pseudonoise signal output from said fourth delay means;
third signal generating means for generating a second Manchester coded pseudonoise signal by encoding the second half-chip delayed pseudonoise signal output from said third delay means in accordance with the clock signal output from said voltage-controlled oscillator;
first means for multiplying the second sum pseudonoise signal output from said second signal generating means by the transmitted signal from the transmitter to produce a first multiplied signal, and for passing said first multiplied signal through a first low-pass filter to produce a first correlated signal indicating the first information at the output of the first low-pass filter;
second means for multiplying the second Manchester coded pseudonoise signal output from said third signal generating means by the transmitted signal received from the transmitter to produce a second multiplied signal, and for passing said second multiplied signal through a second low-pass filter to produce a second correlated signal indicating the second information at the output of the second low-pass filter; and
sync signal means for multiplying the first correlated signal output from said first means by the second correlated signal output from said second means to produce a multiplied signal, and for passing said multiplied signal through a loop filter to produce a sync signal at the output of the loop filter, and for supplying said sync signal to said voltage-controlled oscillator, so that said second pseudonoise signal generator generates the second pseudonoise signal in accordance with the clock signal output from said voltage-controlled oscillator.

21. A spread spectrum communication system according to claim 19, wherein said receiver comprises:
a second oscillator for generating a second carrier signal of an intermediate frequency added to a local frequency;
frequency converting means for multiplying the transmitted signal from the transmitter by the second carrier signal output from said second oscillator to produce a reception signal of the intermediate frequency;
a voltage-controlled oscillator for generating a clock signal at a frequency according to a sync signal;
a second pseudonoise signal generator for generating a second pseudonoise signal in accordance with the clock signal output from said voltage-controlled oscillator, in which the sequence of said second pseudonoise signal accords with the sequence of the pseudonoise signal generated by the pseudonoise signal generator of the transmitter;
signal generating means for generating a second Manchester coded pseudonoise signal by encoding the second pseudonoise signal output from said second pseudonoise signal generator in accordance with the clock signal output from said voltage-controlled oscillator;
third delay means for generating a second half-chip delayed pseudonoise signal by delaying the second pseudonoise signal output from said second pseudonoise signal generator;
fourth delay means for generating a second one-chip delayed pseudonoise signal by delaying the second half-chip delayed pseudonoise signal output from said third delay means;
second signal generating means for generating a second sum pseudonoise signal as the sum of the second pseudonoise signal output from said second pseudonoise signal generator and the second one-chip delayed pseudonoise signal output from said fourth delay means;
first means for multiplying the second sum pseudonoise signal output from said second signal generating means by the reception signal output from said frequency converting means to produce a first multiplied signal, and for passing said first multiplied signal through a first band-pass filter to produce a first correlated signal at the output of the first band-pass filter;
second means for multiplying the second Manchester coded pseudonoise signal from said signal generating means by the reception signal output from said frequency converting means to produce a second multiplied signal, and for passing said second multiplied signal through a second band-pass filter to produce a second correlated signal at the output of the second band-pass filter;
sync signal means for multiplying the first correlated signal from said first means by the second correlated signal from said second means to produce a multiplied signal, and for passing said multiplied signal through a loop filter to produce a sync signal at the output of the loop filter, and for supplying said sync signal to said voltage-controlled oscillator, so that said second pseudonoise signal generator generates the second pseudonoise signal in accordance with the clock signal output from said voltage-controlled oscillator;
carrier reproducing means for multiplying either the first correlated signal or the second correlated signal by itself, and for passing the multiplied correlated signal through a third band-pass filter, and for generating a carrier signal of the intermediate frequency by dividing the frequency of a signal output from said third band-pass filter;
third means for multiplying the first correlated signal output from said first means by the carrier signal output from said carrier reproducing means to produce a third multiplied signal, and for passing the third multiplied signal through a first low-pass filter to reproduce the first data signal at the output of the first low-pass filter; and fourth means for multiplying the second correlated signal output from said second means by the carrier signal output from said carrier reproducing means to produce a fourth multiplied signal, and for passing the fourth multiplied signal through a second low-pass filter to reproduce the second data signal at the output of the second low-pass filter.

22. A spread spectrum communication system which comprises:

a transmitter comprising:

a pseudonoise signal generator for generating a pseudonoise signal in accordance with a clock signal;

first delay means for generating a half-chip delayed pseudonoise signal by delaying the pseudonoise signal output from said pseudonoise signal generator by a half-chip cycle;

second delay means for generating a one-chip delayed pseudonoise signal by delaying the half-chip delayed pseudonoise signal output from said first delay means by a half-chip cycle;

second pseudonoise signal means for generating a difference pseudonoise signal as the difference between the pseudonoise signal output from said pseudonoise signal generator and the one-chip delayed pseudonoise signal output from said second delay means;

first modulation means for generating a first spread spectrum signal by multiplying the half-chip delayed pseudonoise signal output from said first delay means by a first data signal indicating first information;

second modulation means for generating a second spread spectrum signal by multiplying the difference pseudonoise signal output from said second pseudonoise signal means by a second data signal indicating second information; and synthesizing means for generating a signal to be transmitted, by adding the first spread spectrum signal output from said first modulation means to the second spread spectrum signal output from said second modulation means, and a receiver responsive to the signal transmitted by said transmitter.

* * * * *